(12) United States Patent
Woo

(10) Patent No.: US 12,451,938 B2
(45) Date of Patent: Oct. 21, 2025

(54) ELECTRONIC DEVICE COMPRISING ANTENNA

(71) Applicant: LG ELECTRONICS INC., Seoul (KR)

(72) Inventor: Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 17/909,322

(22) PCT Filed: Mar. 5, 2020

(86) PCT No.: PCT/KR2020/095019
§ 371 (c)(1),
(2) Date: Sep. 2, 2022

(87) PCT Pub. No.: WO2021/177575
PCT Pub. Date: Sep. 10, 2021

(65) Prior Publication Data
US 2023/0089409 A1    Mar. 23, 2023

(51) Int. Cl.
*H04B 7/06* (2006.01)
*H01Q 1/24* (2006.01)
(Continued)

(52) U.S. Cl.
CPC ........... *H04B 7/0602* (2013.01); *H01Q 1/243* (2013.01); *H01Q 9/0407* (2013.01); *H01Q 21/08* (2013.01); *H01Q 25/002* (2013.01); *H04B 1/38* (2013.01)

(58) Field of Classification Search
CPC ...... H04B 7/0602; H04B 1/38; H04B 7/0404; H04B 7/0469; H04B 7/0608;
(Continued)

(56) References Cited

U.S. PATENT DOCUMENTS

| 7,324,782 | B1 * | 1/2008 | Rudrapatna | .......... | H04B 7/0602 |
| | | | | | 455/25 |
| 7,565,113 | B2 * | 7/2009 | Dacosta | ................. | H04B 1/005 |
| | | | | | 455/504 |

(Continued)

FOREIGN PATENT DOCUMENTS

| JP | 2002118512 | 4/2002 |
| JP | 2017-152830 | 8/2017 |

(Continued)

OTHER PUBLICATIONS

Y. Roy, J . . . -Y. Chouinard and S. A. Mahmoud, "Selection diversity combining with multiple antennas for MM-wave indoor wireless channels," in IEEE Journal on Selected Areas in Communications, vol. 14, No. 4, pp. 674-682, May 1996 (Year: 1996).*

(Continued)

*Primary Examiner* — Wesley L Kim
*Assistant Examiner* — Swati Jain
(74) *Attorney, Agent, or Firm* — LEE, HONG, DEGERMAN, KANG & WAIMEY

(57) ABSTRACT

One embodiment provides an electronic device comprising an antenna. The electronic device comprises: an array antenna including a plurality of antenna elements; a transceiver circuit operatively coupled to the array antenna and configured to control a signal of a millimeter wave band applied to the array antenna; and a processor operatively coupled to the transceiver circuit and configured to control the transceiver circuit. The processor can emit a signal to a second electronic device through one antenna element of the plurality of antenna elements, select an optimum antenna element on the basis of a data rate in the second electronic device which has received the signal, and communicate with the second electronic device through the selected antenna element.

16 Claims, 16 Drawing Sheets

(51) Int. Cl.
*H01Q 9/04* (2006.01)
*H01Q 21/08* (2006.01)
*H01Q 25/00* (2006.01)
*H04B 1/38* (2015.01)

(58) Field of Classification Search
CPC ........ H04B 7/0691; H04B 7/10; H01Q 1/243; H01Q 9/0407; H01Q 21/08; H01Q 25/002; H01Q 1/2283; H01Q 3/247; H01Q 1/38; H01Q 21/061
See application file for complete search history.

(56) References Cited

U.S. PATENT DOCUMENTS

| | | | |
|---|---|---|---|
| 10,455,442 B1* | 10/2019 | Li | H04B 7/0802 |
| 11,552,392 B2* | 1/2023 | Jung | H01Q 1/243 |
| 11,606,126 B2* | 3/2023 | Jeon | H04B 1/401 |
| 12,040,860 B2* | 7/2024 | Raghavan | H04B 7/0874 |
| 2007/0066361 A1* | 3/2007 | Knudsen | H01Q 21/28 455/562.1 |
| 2012/0220238 A1* | 8/2012 | Hosoya | H04B 7/06 455/63.4 |
| 2012/0314649 A1* | 12/2012 | Forenza | H04B 7/0465 370/328 |
| 2013/0029672 A1* | 1/2013 | Rofougaran | H04B 7/12 455/445 |
| 2013/0107915 A1* | 5/2013 | Benjebbour | H04B 7/0486 375/295 |
| 2013/0308477 A1* | 11/2013 | He | H04W 24/02 370/252 |
| 2013/0308554 A1* | 11/2013 | Ngai | H04B 1/44 370/329 |
| 2014/0334322 A1* | 11/2014 | Shtrom | H04B 7/063 370/252 |
| 2015/0195018 A1* | 7/2015 | Xiao | H04B 7/063 375/267 |
| 2016/0269086 A1* | 9/2016 | Clevorn | H04B 7/061 |
| 2019/0007121 A1* | 1/2019 | Zhinong | H04B 17/29 |
| 2019/0052345 A1* | 2/2019 | Yunoki | H04B 7/0695 |
| 2019/0165452 A1* | 5/2019 | Jeon | H01Q 9/0421 |
| 2019/0239233 A1* | 8/2019 | Ryu | H04W 72/541 |
| 2019/0273551 A1* | 9/2019 | Mobasher | H04B 7/0691 |
| 2020/0358165 A1* | 11/2020 | Jeong | H04M 1/026 |
| 2020/0365987 A1* | 11/2020 | Kim | H01Q 3/24 |
| 2021/0152219 A1* | 5/2021 | Rusek | H04B 7/0628 |
| 2021/0159596 A1* | 5/2021 | Park | H01Q 3/24 |
| 2021/0234586 A1* | 7/2021 | Raghavan | H04B 7/088 |
| 2021/0297117 A1* | 9/2021 | Calzolari | H04W 52/245 |
| 2022/0110005 A1* | 4/2022 | Huang | H04B 7/063 |
| 2022/0158361 A1* | 5/2022 | Kim | H01Q 9/0407 |
| 2022/0278702 A1* | 9/2022 | Ouyang | H04B 1/03 |

FOREIGN PATENT DOCUMENTS

| | | |
|---|---|---|
| JP | 2019-146180 | 8/2019 |
| KR | 10-0834644 | 6/2008 |
| KR | 1020190026272 | 3/2019 |

OTHER PUBLICATIONS

Korean Intellectual Property Office Application No. 10-2022-7011662, Notice of Allowance dated Feb. 3, 2024, 6 pages.
PCT International Application No. PCT/KR2020/095019, International Search Report dated Dec. 2, 2020, 4 pages.

* cited by examiner mmWave Short-range Communication

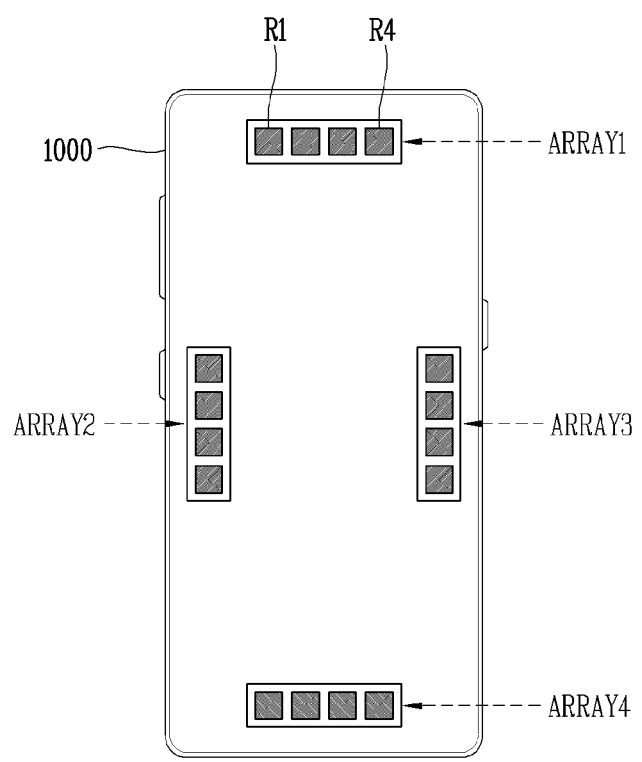

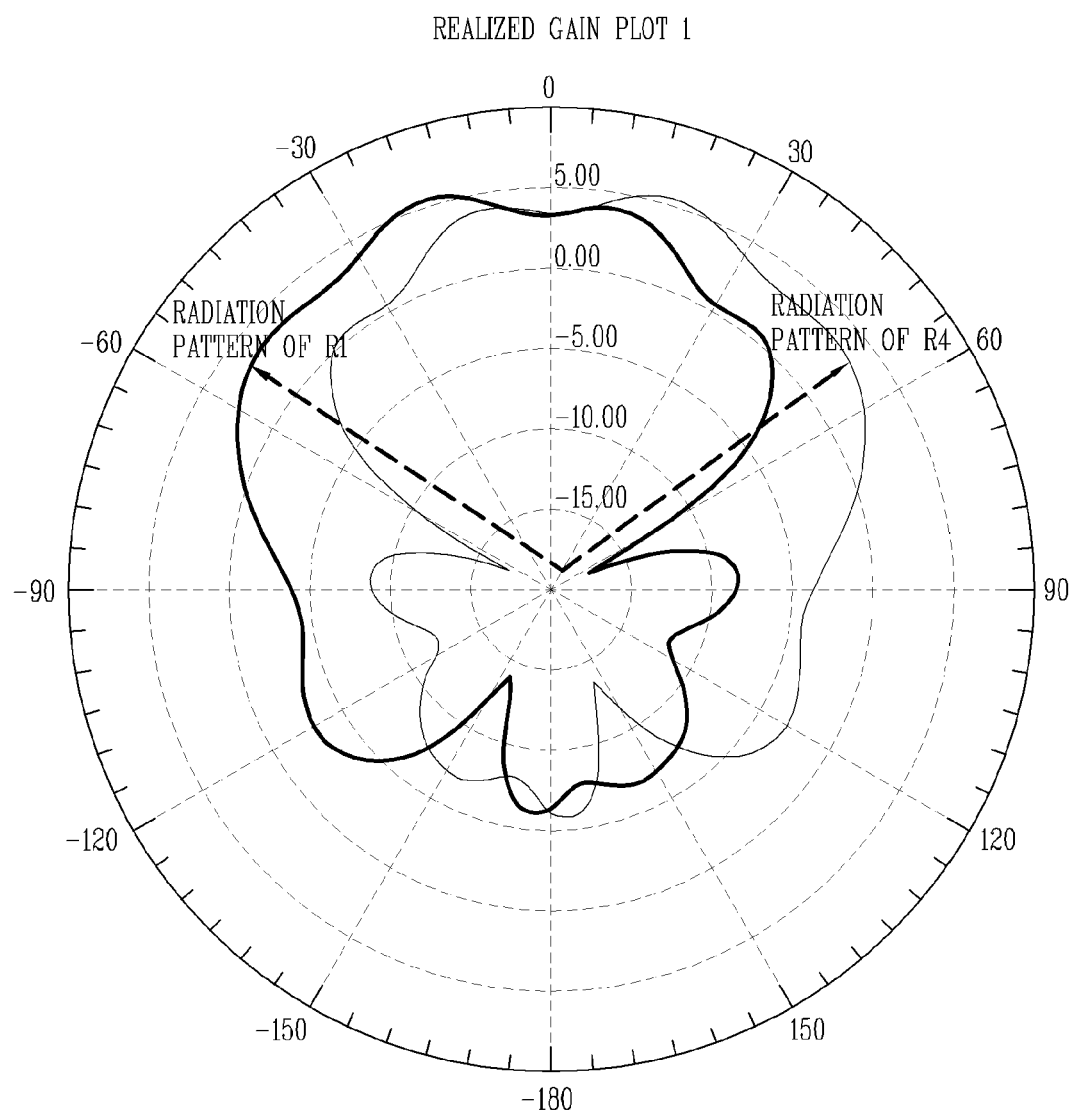

ELECTRONIC DEVICE COMPRISING ANTENNA

CROSS-REFERENCE TO RELATED APPLICATIONS

This application is the National Stage filing under 35 U.S.C. 371 of International Application No. PCT/KR2020/095019, filed on Mar. 5, 2020, the contents of which are hereby incorporated by reference herein its entirety.

TECHNICAL FIELD

The present disclosure relates to an electronic device having antennas. One particular implementation relates to an antenna module having an array antenna that operates in a millimeter wave band.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 38.5 GHz band, and a 64 GHz band are being considered as frequency bands to be allocated for 5G communication services in such mmWave bands. In this regard, a plurality of array antennas may be disposed in an electronic device in the mmWave bands.

In this regard, beam tracking for communication between electronic devices using a mmWave antenna module in a mmWave band has the following problem: beam tracking has to be performed by sequentially operating possible beam combinations within the mmWave antenna module. Accordingly, beam search/tracking need to be repeated in order to locate a Tx/Rx electronic device every time the location of the TX electronic device or RX electronic device is changed.

For an electronic device such as a mobile terminal, the above operation scenario may end up in a highly unstable communication environment. Also, even if the communication environment is improved, it causes a lot of power consumption and heat on the mmWave module.

DISCLOSURE OF INVENTION

Technical Problem

The present disclosure is directed to solving the aforementioned problems and other drawbacks. Another aspect of the present disclosure is to provide an electronic device comprising an antenna module with an array antenna operating in a millimeter-wave band and a configuration for controlling the same.

Another aspect of the present disclosure is to provide a communication service between electronic devices without going through a base station in a millimeter-wave band.

Still another aspect of the present disclosure is to select an optimum antenna combination in order to provide 5G data communication between electronic devices.

A further aspect of the present disclosure is to provide 5G data communication by selecting an optimum antenna combination in order to provide 5G data communication between electronic devices in accordance with communication performance indicators.

Solution to Problem

To achieve these and other advantages and in accordance with the purpose of the present disclosure, as embodied and broadly described herein, there is provided an electronic device comprising an antenna. The electronic device may comprise: an array antenna including a plurality of antenna elements; a transceiver circuit operatively coupled to the array antenna and configured to control a signal of a millimeter wave band applied to the array antenna; and a processor operatively coupled to the transceiver circuit and configured to control the transceiver circuit. The processor may control a signal to be radiated to a second electronic device through one antenna element of the plurality of antenna elements, select an optimum antenna element on the basis of a data rate in the second electronic device which has received the signal, and communicate with the second electronic device through the selected antenna element.

According to an embodiment, the array antenna may include first to third antenna elements disposed on a flexible printed circuit board (FPCB). At least one of the first to third antenna elements may be operated which is disposed in different positions on the FPCB and cover one of different coverage areas.

According to an embodiment, a signal may be sent through a first antenna element disposed on the far left in the array antenna and a fourth antenna element disposed on the far right. A signal may be received through a first antenna element disposed on the far left in an array antenna of the second electronic device and a fourth antenna element disposed on the far right.

According to an embodiment, the processor may determine a first data rate in the second electronic device which has received a first signal radiated through the first antenna element in the array antenna. The processor may determine a second data rate in the second electronic device which has received a second signal radiated through the fourth antenna element in the array antenna.

According to an embodiment, the processor may determine the first data rate when the first signal radiated through the first antenna element in the array antenna is received through the first antenna element in the array antenna of the second electronic device. The processor may determine the second data rate when the second signal radiated through the fourth antenna element in the array antenna is received through the first antenna element in the array antenna of the second electronic device.

According to an embodiment, the processor may determine a third data rate when a third signal radiated through the first antenna element in the array antenna is received through the fourth antenna element in the array antenna of the second electronic device. The processor may determine a fourth data rate when a fourth signal radiated through the fourth antenna element in the array antenna is received through the fourth antenna element in the array antenna of the second electronic device.

According to an embodiment, the processor may select an optimum antenna element corresponding to the higher of the first and second data rates, and communicate with the second electronic device through the selected antenna element.

According to an embodiment, the processor may select an optimum antenna element corresponding to the highest of the first to fourth data rates, and communicate with the second electronic device through the selected antenna element.

According to an embodiment, the processor may send and receive a signal through a vertical polarization signal and a horizontal polarization signal, for each of the first to fourth antenna elements. The processor may select an optimum combination of antenna elements based on an average value of different data rates for the received vertical and horizontal polarization signals.

According to an embodiment, the processor may send and receive a signal through a vertical polarization signal and a horizontal polarization signal, for each of the first to fourth antenna elements. The processor may select an optimum antenna element and an optimum polarization combination based on different antenna combinations and different data rates for different combinations of the received vertical and horizontal polarization signals.

According to an embodiment, the processor may control a first transmitter module corresponding to the first antenna element to go into an on state. The processor may determine a data rate in the second electronic device, and send a control message such that a first receiver module corresponding to the first antenna element of the second electronic device goes into an off state.

According to an embodiment, the processor may control a fourth transmitter module corresponding to the fourth antenna element to go into an on state. The processor may determine a data rate in the second electronic device, and send a control message such that a fourth receiver module corresponding to the fourth antenna element of the second electronic device goes into an off state.

According to an embodiment, the electronic device may further comprise a second transceiver circuit that operates in a different frequency band than the millimeter wave band. The processor may receive a data rate in the second electronic device through the second transceiver circuit. The processor may control the second transceiver circuit such that a control message for controlling a receiver module of the second electronic device is sent through the second transceiver circuit.

According to an embodiment, the electronic device may further comprise a second transceiver circuit that operates in a different frequency band than the millimeter wave band. The processor may receive a data rate in the second electronic device through the second transceiver circuit. The processor may control the transceiver circuit and the second transceiver circuit such that a control message for controlling a receiver module of the second electronic device is sent through the transceiver circuit and the second transceiver circuit.

According to an embodiment, the electronic device may further comprise a sensor module configured to detect the movement, position, and orientation state of the electronic device. Upon determining that the electronic device detected through the sensor module and the second electronic device are in proximity within a predetermined distance, the processor may radiate a signal to the second electronic device through one of the plurality of antenna elements. The processor may select an optimum antenna element on the basis of a data rate in the second electronic device which has received the signal.

According to an embodiment, upon determining that the electronic device detected through the sensor module and the second electronic device are in proximity within a predetermined distance, the processor may control a first transmitter module corresponding to the first antenna element to go into an on state. The processor may determine a data rate in the second electronic device, and send a control message such that a first receiver module corresponding to the first antenna element of the second electronic device goes into an off state.

Another embodiment of the present disclosure provides a method of performing mmWave band short-range communication in an electronic device. The method may be performed by a processor, and the method may comprise: a signal transmission step in which a transceiver circuit is controlled such that a signal is radiated to a second electronic device through one antenna element of a plurality of antenna elements constituting an array antenna; an antenna selection step in which an optimum antenna element is selected on the basis of a data rate in the second electronic device which has received the signal; and a communication step in which the electronic device communicates with the second electronic device through the selected antenna element.

According to an embodiment, in the signal transmission step, a first signal may be sent through a first antenna element disposed on the far left in the array antenna, and a second signal may be sent through a fourth antenna element disposed on the far right. Accordingly, the first signal may be received through a first antenna element disposed on the far left in an array antenna of the second electronic device, and the second signal may be received through a fourth antenna element disposed on the far right.

According to an embodiment, the method may further comprise a data rate determination step in which a data rate in the second electronic device which has received the signal is determined after the signal transmission step.

According to an embodiment, in the data rate determination step, a first data rate in the second electronic device which has received a first signal radiated through the first antenna element in the array antenna may be determined. A second data rate in the second electronic device which has received a second signal radiated through the fourth antenna element in the array antenna may be determined.

According to an embodiment, in the data rate determination step, the first data rate may be determined when the first signal radiated through the first antenna element in the array antenna is received through the first antenna element in the array antenna of the second electronic device. In the data rate determination step, the second data rate may be determined when the second signal radiated through the fourth antenna element in the array antenna is received through the first antenna element in the array antenna of the second electronic device.

Furthermore, in the data rate determination step, a third data rate may be determined when a third signal radiated through the first antenna element in the array antenna is received through the fourth antenna element in the array antenna of the second electronic device. In the data rate determination step, a fourth data rate may be determined when a fourth signal radiated through the fourth antenna element in the array antenna is received through the fourth antenna element in the array antenna of the second electronic device.

According to an embodiment, the method may further comprise a transmitter module control step in which a first transmitter module corresponding to the first antenna element is controlled to go into an on state before the signal transmission step. The method may further comprise a control message transmission step in which a control message is sent such that a first receiver module corresponding to the first antenna element of the second electronic device goes into an off state, after the data rate determination step.

According to an embodiment, in the transmitter module control step, a fourth transmitter module corresponding to the fourth antenna element may be controlled to go into an on state. In the control message transmission step, a data rate in the second electronic device may be determined, and a control message may be sent such that a fourth receiver module corresponding to the fourth antenna element of the second electronic device goes into an off state.

Advantageous Effects of Invention

Technical advantages of such an array antenna operating in a millimeter-wave band and an electronic device for controlling the same will be described below.

According to an embodiment, it is possible to provide a communication service between electronic devices without going through a base station in a millimeter-wave band.

According to an embodiment, it is possible to select an optimum antenna combination in order to provide 5G data communication between electronic devices.

According to an embodiment, it is possible to provide 5G data communication by selecting an optimum antenna combination in order to provide 5G data communication between electronic devices in accordance with communication performance indicators such as data rate.

According to an embodiment, it is possible to provide 5G data communication between electronic devices through one antenna element within an array antenna without a repetitive beamforming process.

According to an embodiment, it is possible to solve the problems of power consumption and heat generation resulting from the repetitive beamforming process.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

BRIEF DESCRIPTION OF DRAWINGS

FIG. 4C shows a configuration in which a plurality of array antennas is disposed on an electronic device.

FIG. 10 shows a radiation pattern of a signal radiated through a far-left antenna element in an array antenna and a radiation pattern of a signal radiated through a far-right antenna element.

MODE FOR THE INVENTION

Figure 1:
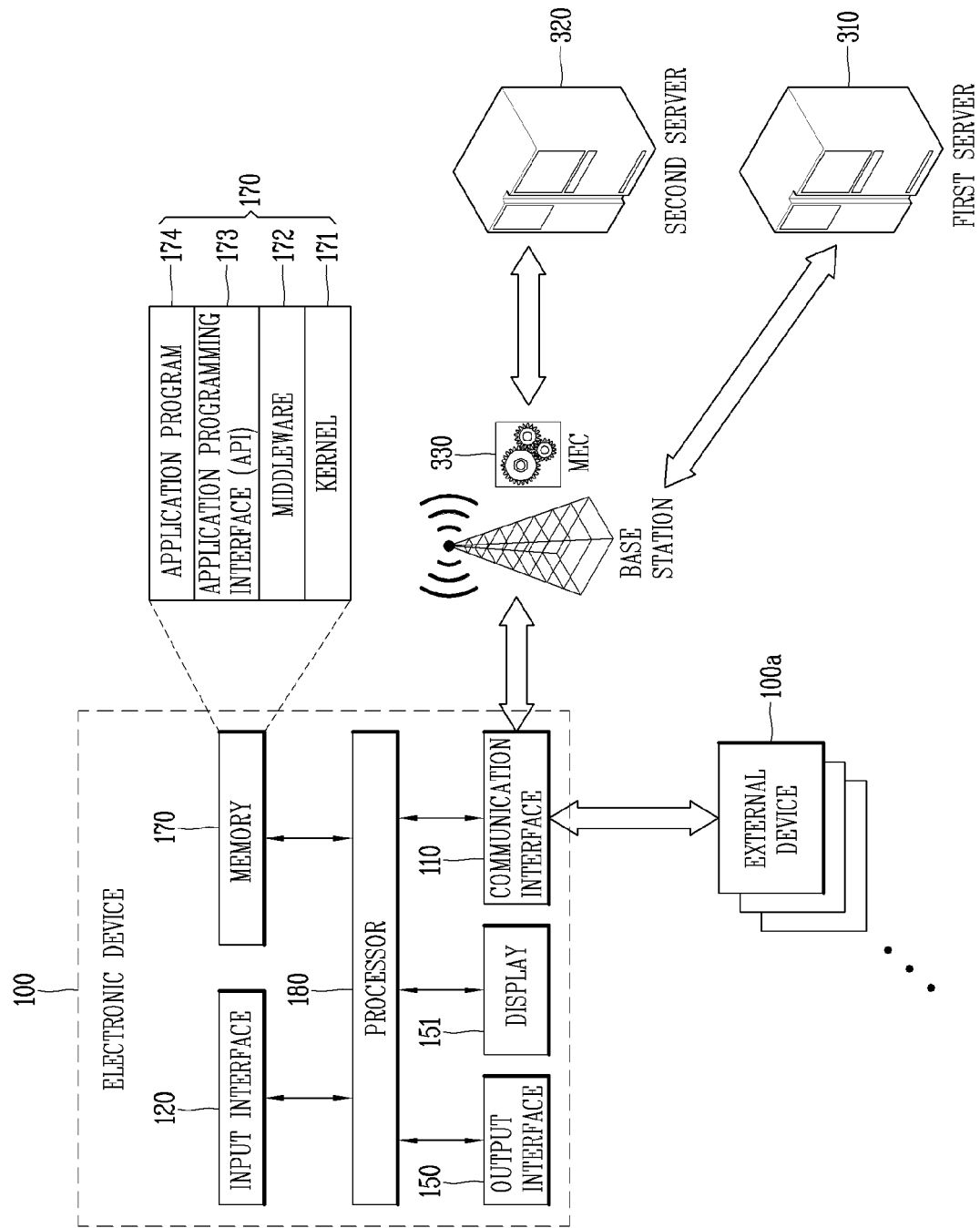
FIG. 1 is a view illustrating a configuration for describing an electronic device in accordance with one embodiment, and an interface between the electronic device and an external device or server.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 2A:
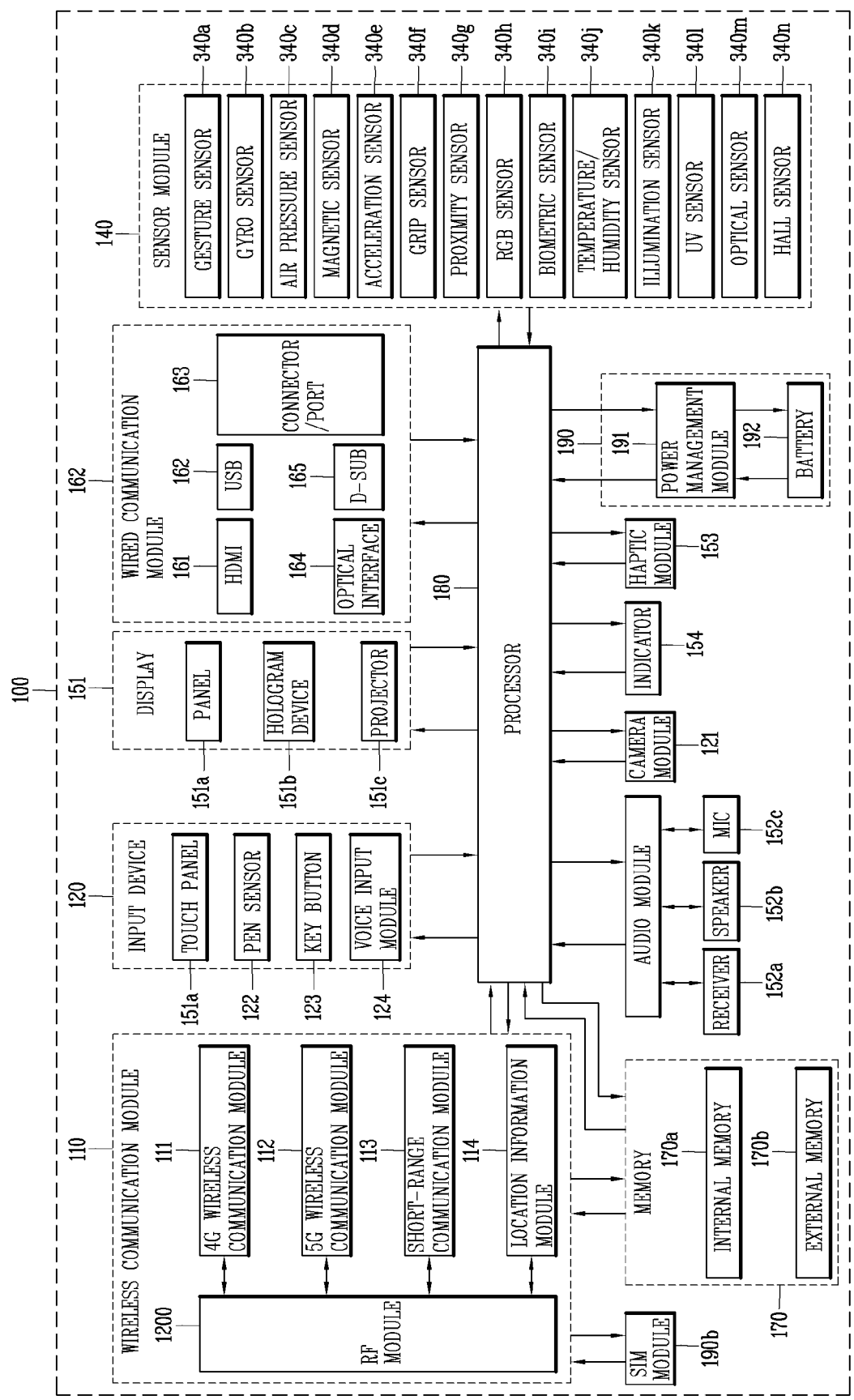
FIG. 2A is a view illustrating a detailed configuration of the electronic device of FIG. 1.
Figure 2B:
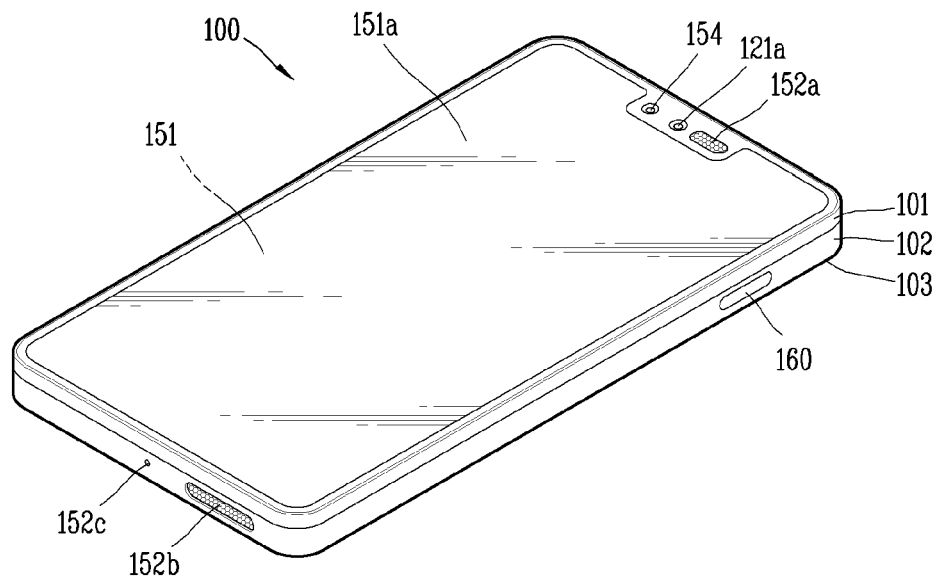
FIGS. 2B and 2C are conceptual views illustrating one example of an electronic device according to the present disclosure, viewed from different directions.
Figure 2C:
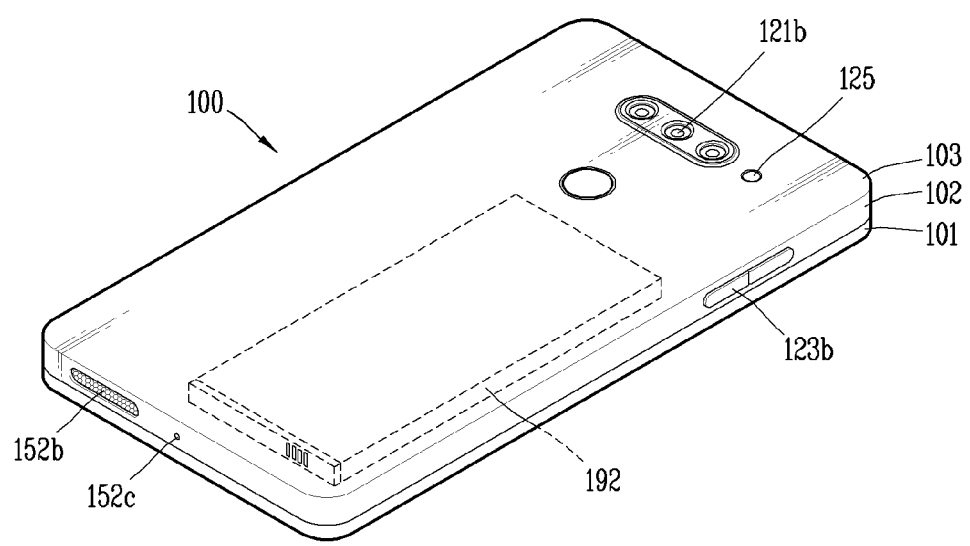

FIG. 1 is a view illustrating a configuration for describing an electronic device in accordance with one embodiment, and an interface between the electronic device and an external device or server. Meanwhile, referring to FIGS. 2A to 2B, FIG. 2A is a view illustrating a detailed configuration of the electronic device of FIG. 1. FIGS. 2B and 2C are conceptual views illustrating one example of an electronic device according to the present disclosure, viewed from different directions.

Referring to FIG. 1, the electronic device 100 may include a communication interface 110, an input interface (or an input device) 120, an output interface (or an output device) 150, and a processor 180. Here, the communication interface 110 may refer to the wireless communication module 110.

The electronic device 100 may further include a display 151 and a memory 170. It is understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1 and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE refarming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication between electronic devices may be performed in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. The input device 120 may include a camera module 121 or an image input unit for obtaining images or video, a microphone 152c or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g. RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using light interference. The projector 151c may display an image by projecting light onto a screen. The screen may be located inside or outside the electronic device 100, for example.

The audio module 152 may interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory Memory 170 may include a volatile memory and/or a non-volatile memory. The memory 170 may also include an internal memory 170a and an external memory 170b. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an implementation, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to an implementation, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an implementation, the electronic device 100 may be connected to at least one external device 100a through a wired or wireless communication interface to receive or transmit information. For example, the electronic device 100 and the at least one external device 100a include a near field communication (NFC), a charger (e.g., Information can be received or transmitted in a universal serial bus (USB)—C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a which is an assistant device linked with the electronic device 100, may be a device designed for various purposes, such as convenience of use, more attractive appearance, enhancement of usability, etc. of the electronic device 100. At least one external device 100a may or may not be in physical contact with the electronic device 100. According to one implementation, the at least one external device 100a may be functionally connected to the electronic device 100 using a wired/wireless communication module to control information for controlling content or a function in the electronic device 100.

Meanwhile, the first server 310 may include a server or a cloud device for services related to the at least one external device 100a or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

Referring to FIGS. 2B and 2C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100, referring to FIGS. 2A to 2C, may include a display 151, first and second audio output modules 152a, 152b, a proximity sensor 141, an illumination sensor 152, an optical output module 154, first and second cameras 121a, 121b, first and second manipulation units 123a, 123b, a microphone 152c, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a processor 180 may generate a control command corresponding to the touch. Contents input in the touch manner may be characters, numbers, instructions in various modes, or a menu item that can be specified.

In this way, the display 151 may form a touch screen together with the touch sensor, and in this case, the touch screen may function as the user input unit (123, see FIGS. 2A and 2B). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the processor 180 may control the optical output module 154 to stop the light output.

The first camera 121a may process image frames such as still or moving images obtained by the image sensor in a capture mode or a video call mode. The processed image frames can then be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained. The flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. The microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 2A) for supplying power to the electronic device 100. The power supply unit 190 may include a batter 191 which is mounted in the terminal body or detachably coupled to an outside of the terminal body.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be a mmWave band but is not limited thereto, and may be changed depending on applications.

Figure 3A:
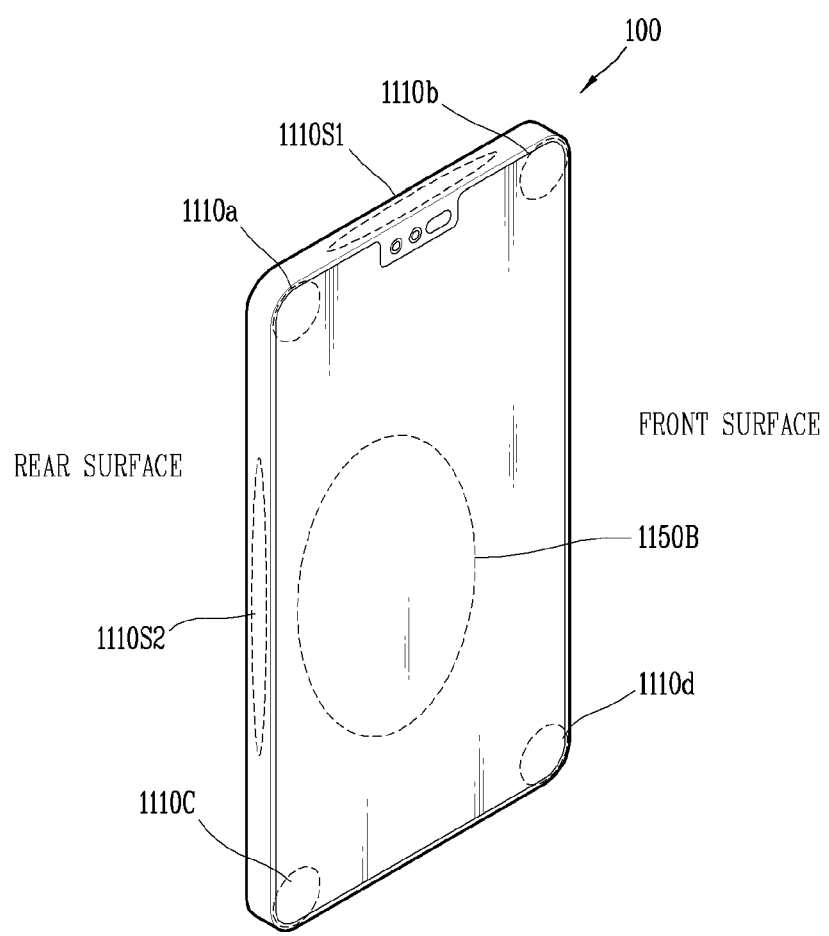
FIG. 3A illustrates an exemplary configuration in which a plurality of antennas of the electronic device can be arranged.

FIG. 3A illustrates an exemplary configuration in which a plurality of antennas of the electronic device can be arranged. Referring to FIG. 3, a plurality of antennas 1110a to 1110d may be arranged in the electronic device 100 or on a front surface of the electronic device 100. In this regard, the plurality of antennas 1110a to 1110d may be implemented in a form printed on a carrier inside the electronic device or may be implemented in a form of system-on-chip (Soc) together with an RFIC. The plurality of antennas 1110a to 1110d may be disposed on the front surface of the electronic device in addition to the inside of the electronic device. Here, the plurality of antennas 1110a to 1110d disposed on the front surface of the electronic device 100 may be implemented as transparent antennas embedded in the display.

A plurality of antennas 1110S1 and 1110S2 may also be disposed on side surfaces of the electronic device 100. In this regard, 4G antennas in the form of conductive members may be disposed on the side surfaces of the electronic device 100, slots may be formed in conductive member regions such that the plurality of antennas 1110a to 1110d can radiate 5G signals through the slots. Antennas 1150B may additionally be disposed on the rear surface of the electronic device 100 to radiate 5G signals rearward.

In some examples, at least one signal may be transmitted or received through the plurality of antennas 1110S1 and 1110S2 on the side surfaces of the electronic device 100. In some examples, at least one signal may be transmitted or received through the plurality of antennas 1110a to 1110d, 1150B, 1110S1, and 1110S2 on the front surface and/or the side surfaces of the electronic device 100. The electronic device may perform communication with a base station through any one of the plurality of antennas 1110a to 1110d, 1150B, 1110S1, and 1110S2. Alternatively, the electronic device may perform MIMO communication with a base station through two or more antennas among the plurality of antennas 1110a to 1110d, 1150B, 1110S1, 1110S2.

Figure 3B:
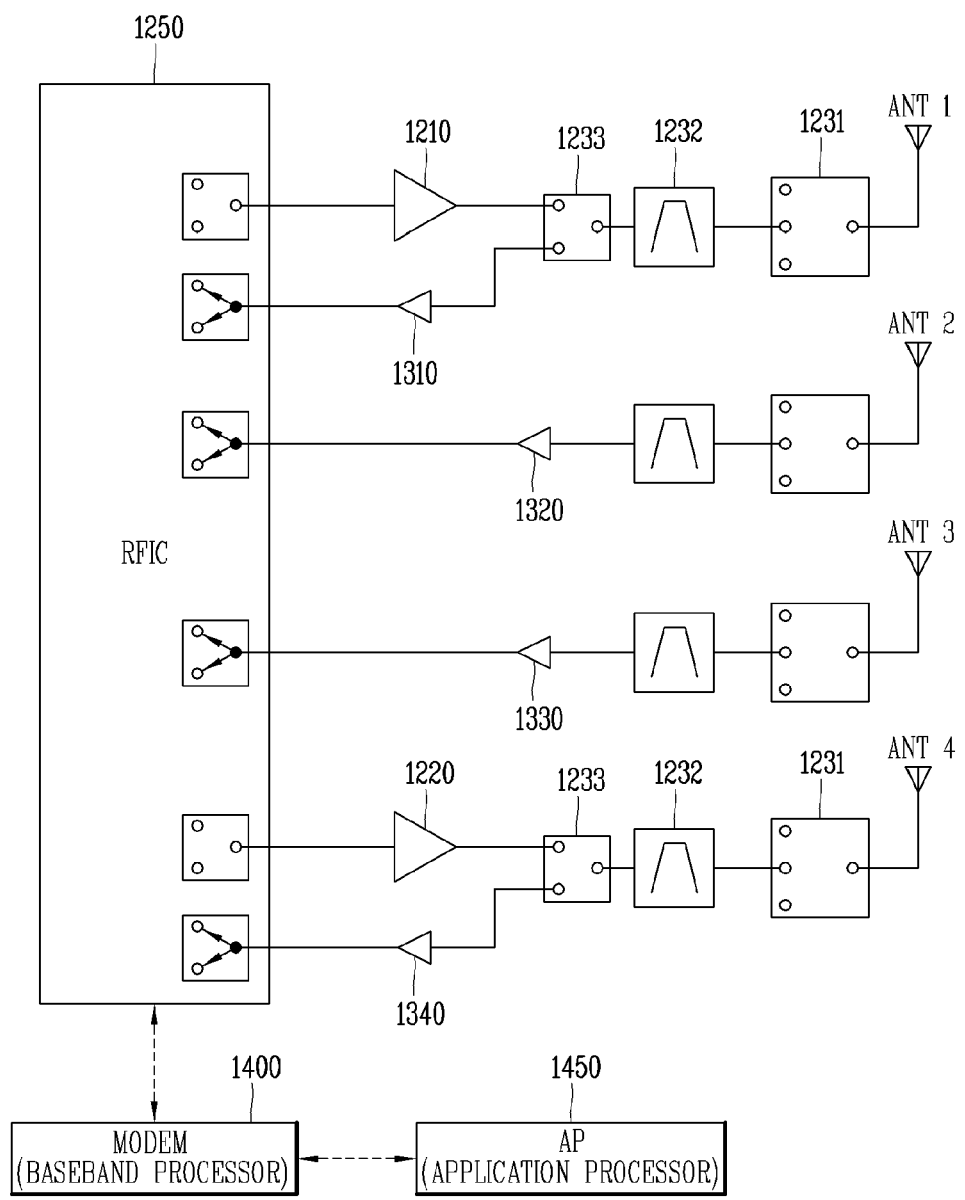
FIG. 3B is a diagram illustrating a configuration of a wireless communication module of an electronic device operable in a plurality of wireless communication systems according to an implementation.

FIG. 3B is a diagram illustrating a configuration of a wireless communication module of an electronic device operable in a plurality of wireless communication systems according to an implementation. Referring to FIG. 3B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 3B, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another implementation, the application processor (AP) 500 may control the modem 300 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 500 may control the modem 1400 and the RFIC 1250 to receive data through both the 4G base station and 5G base station.

Meanwhile, in a multi-transceiving system of FIG. 3B, a transmitter and a receiver of each radio system may be integrated into a single transceiver. Accordingly, a circuit portion for integrating two types of system signals may be removed from an RF front-end.

In addition, since the front-end component can be controlled by the integrated transceiver, the front-end component can be more efficiently integrated than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in a 4G band or a Sub 6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mmWave) band, first to fourth antennas ANT1 to ANT4 may be configured to operate in either one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 1210 and 1220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device capable of operating in a plurality of wireless communication systems according to an implementation may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as an array antenna ANT1 to ANT4 including a plurality of antenna elements. Specifically, the phase controller 1230 may control a phase of a signal applied to each antenna element of each of the array antennas ANT1 to ANT4. Specifically, the phase controller 1230 may control both magnitude and phase of a signal applied to each antenna element of each of the array antennas ANT1 to ANT4. Since the phase controller 1230 controls both the magnitude and the phase of the signal, it may be referred to as a power and phase controller 230.

Therefore, by controlling the phase of the signal applied to each antenna element of each of the array antennas ANT1 to ANT4, beam-forming can be independently performed through each of the array antennas ANT1 to ANT4. In this regard, multi-input/multi-output (MIMO) may be performed through each of the array antennas ANT1 to ANT4. In this case, the phase controller 230 may control the phase of the signal applied to each antenna element so that each of the array antennas ANT1 to ANT4 can form beams in different directions.

The duplexer 1231 may be configured to separate a signal in a transmission band and a signal in a reception band from each other. In this case, the signal in the transmission band transmitted through the first and second power amplifiers 1210 and 1220 may be applied to the antennas ANT1 and ANT4 through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to pass a signal in a transmission band or a reception band and to block a signal in a remaining band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an implementation of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

Meanwhile, in another implementation of the present invention, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, since the transmission signal and the reception signal can be separated by the duplexer 1231, the switch 1233 may not be necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 1210 and 1220 to transmit a 4G signal or a 5G signal in the specific time interval. In addition, the RFIC 1250 may control reception circuits including the first to fourth low noise amplifiers 1310 to 1340 to receive a 4G signal or a 5G signal at a specific time interval.

On the other hand, in the electronic device illustrated in FIGS. 1 to 2B, the specific configuration and function of the electronic device including the antennas disposed inside the electronic device as illustrated in FIG. 3A and the multi-transceiving system as illustrated in FIG. 3B will be described below.

In this regard, electronic devices may be configured to provide 5G communication services in various frequency bands. Recently, attempts have been made to provide 5G communication services using a Sub-6 band under a 6 GHz band. In the future, it is also expected to provide high-speed communication services by using a millimeter-wave (mm-Wave) band in addition to the Sub-6 band for a faster data rate.

Meanwhile, a 28 GHz band, a 38.5 GHz band, and a 64 GHz band are being considered as frequency bands to be allocated for 5G communication services, IEEE 802.11 ad, and IEEE 802.11 ay in the mmWave band. In this regard, a plurality of array antennas may be disposed in an electronic device in the mmWave bands.

Through such an array antenna that operates in a mmWave band, the electronic device is able to perform communication with a base station or perform direct communication with another electronic device without going through a base station.

Figure 4A:
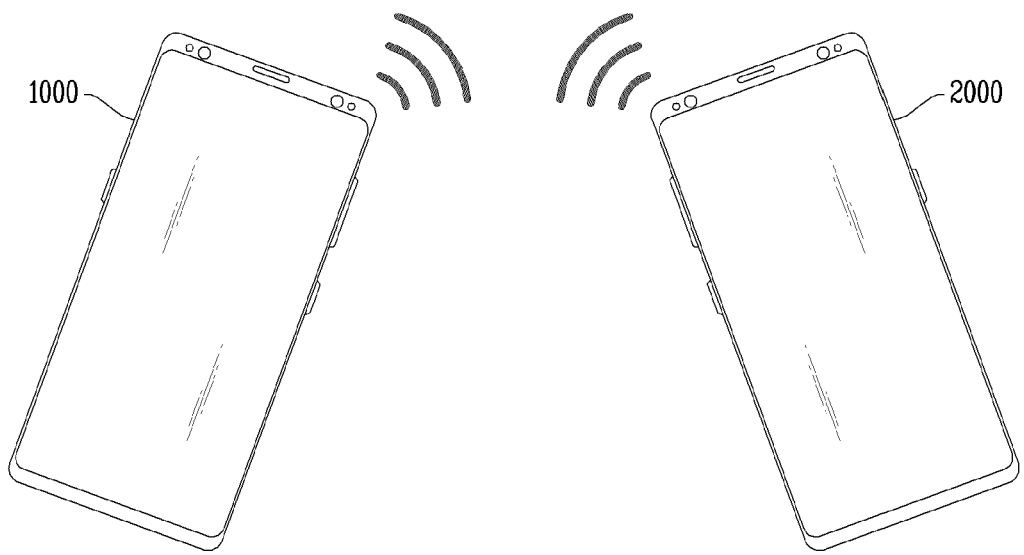
FIG. 4A shows a conceptual diagram of a plurality of electronic devices that perform communication between electronic devices.
Figure 4B:
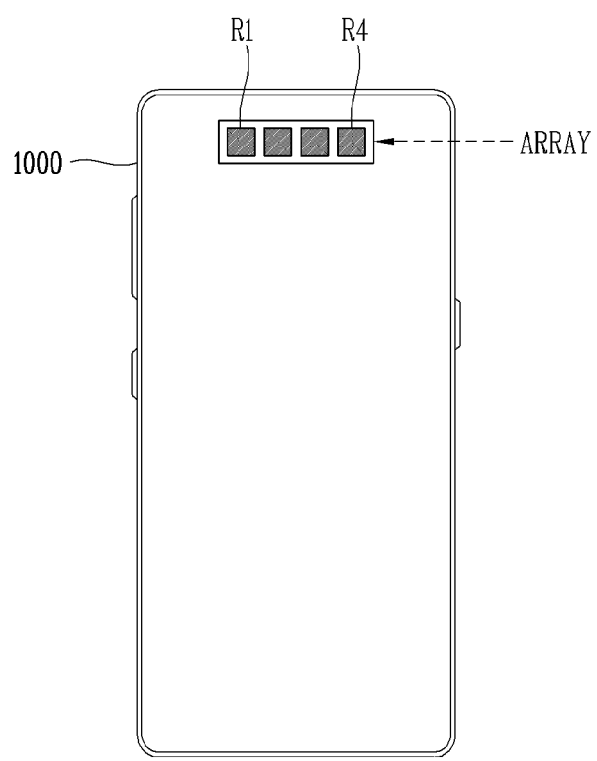
FIG. 4B shows a configuration in which one array antenna is disposed on an electronic device.

In this regard, FIG. 4A shows a conceptual diagram of a plurality of electronic devices that perform communication between electronic devices. Meanwhile, FIG. 4B shows a configuration in which one array antenna is disposed on an electronic device. On the other hand, FIG. 4C shows a configuration in which a plurality of array antennas is disposed on an electronic device.

Figure 5A:
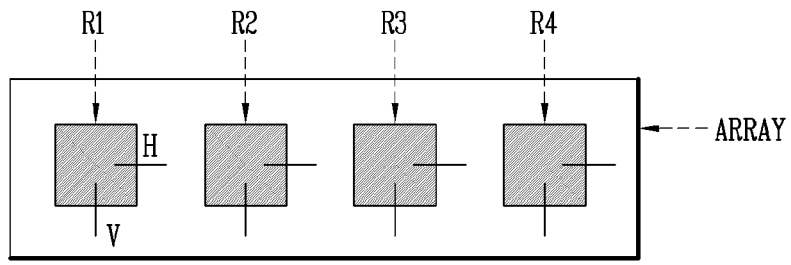
FIG. 5A shows a plurality of antenna elements constituting an array antenna included in an electronic device and a dual feeding structure.

In this regard, FIG. 5A shows a plurality of antenna elements constituting an array antenna included in an electronic device and a dual feeding structure.

Referring to FIG. 4A, as electronic devices 1000 and 2000 carried by the user get closer to each other, a mmWave communication function between the electronic devices may be performed. In this regard, an electronic device may detect the movement, position, and orientation state of the electronic device through a sensor module. Referring to FIGS. 2A and 4A, whether or not the electronic devices are in proximity to each other may be determined by using at least one of the gyro sensor 340b, the acceleration sensor 340e, and the proximity sensor 340g.

Referring to FIG. 4B, the array antenna ARRAY included in the electronic device may be configured to include a plurality of antenna elements, i.e., first to fourth antenna elements R1 to R4. In this regard, the interval between adjacent antenna elements may be set to be 0.5 to 0.7 times the wavelength of an operating frequency.

Referring to FIG. 4C, the array antenna ARRAY included in the electronic device may include a plurality of array antennas ARRAY1 to ARRAY4. In this regard, the array antenna ARRAY may be configured to perform multiple input multiple output (MIMO) through two or more of the plurality of array antennas ARRAY1 to ARRAY4.

In this regard, apart from the patch antenna as in FIGS. 4B and 4C, dipole or monopole antennas may be disposed on the electronic device. However, the dipole or monopole antennas are not easy to be implemented in a metal rim-like shape on a side surface of the electronic device, as shown in FIG. 3A. Also, beam tracking for communication between electronic devices using a mmWave antenna module in a mmWave band has the following problems:

1) Beam tracking needs to be performed by sequentially operating a possible combination of beams within the mmWave antenna module. Thus, beam search/tracking needs to be repeated in order to locate TX/Rx electronic devices every time the locations of the TX electronic device and the RX electronic device are changed.
2) For an electronic device such as a mobile terminal, the above operation scenario ends up in a highly unstable communication environment. Also, even if the communication environment is improved, it causes a lot of power consumption and heat on the mmWave module.

In relation to FIGS. 4A to 5A, a method of performing communication between electronic devices and a configuration and technical features for performing the same are as follows.

1) The electronic devices carried by the user are configured in such a way that their mmWave communication function is turned on as the electronic devices get closer to each other.
2) The mmWave antenna module may be disposed on an upper or lower end of the front or rear of the terminal. Such a mmWave antenna module structure disposed on an end of the electronic device may alleviate the problem of the antenna elements being hidden by the user's hand.
3) A mmWave antenna array may include feeding portions of a predetermined number of antenna elements. In this regard, each antenna element may operate as a dual feed antenna having a horizontal polarization (HP) and a vertical polarization (VP). For example, the antenna array may include four patch antennas and eight feeding portions. In this regard, the eight feeding portions may include four feeding portions for implementing vertical polarization and four feeding portions for implementing horizontal polarization. Meanwhile, V-pol and H-pol are in a relationship of cross polarization.
5) The antenna elements within the mmWave antenna array may be sequentially referred to as first to fourth antenna elements R1 to R4.

Short-range communication between the electronic devices may be performed by using some of the antenna elements of the array antenna that can operate in a millimeter wave (mmWave) band to be described in this specification. In this regard, the array antenna 1100 in FIG. 5A may include a plurality of antenna elements R1 to R4 disposed on a board. Some of the plurality of antennas R1 to R4, for example, the antenna element on the far left or far right, may be used to perform short-range communication between the electronic devices.

Meanwhile, antennas to be described in this specification may be disposed a flexible printed circuit board (FPCB), as well as on a printed circuit board (PCB) configured in a planar form. In this regard, FIG. 5B shows a configuration of a plurality of antenna elements and an RFIC which are disposed on an FPCB.

In this regard, the mmWave array antenna module needs to be disposed in a narrow internal space of the electronic device. In this regard, a structure may be applied in which the mmWave array antenna module is disposed on a FPCB and the FPCB is disposed inside the electronic device in a rollable or foldable form.

Figure 5B:
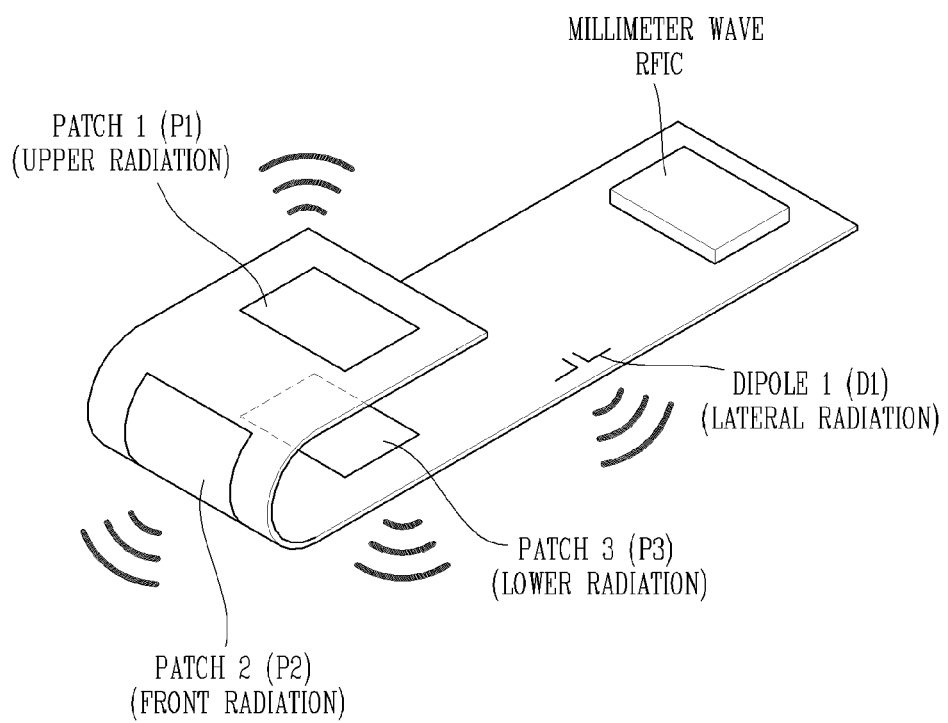
FIG. 5B shows a configuration of a plurality of antenna elements and an RFIC which are disposed on an FPCB.

Referring to FIG. 5B, a plurality of antenna elements P1 to P3 may be disposed on the FPCB. In this regard, the plurality of antenna elements P1 to P3 disposed on the FPCB may be first-type antenna elements such as a patch antenna. The plurality of antenna elements P1 to P3 may include first to third antenna elements P1 to P3. Here, the number of antenna elements is not limited to three, but may vary depending on applications.

Apart from the mmWave array antenna module, an RFIC such as a transceiver circuit may be disposed on the FPCB. In this regard, the RFIC may include a front end module including RF parts such as a power amplifier and a low-noise amplifier. Alternatively, part of the front end module may be disposed for each antenna element in order to minimize loss between the front end module ant the antennas.

Meanwhile, a signal may be applied to all of the plurality of antenna elements P1 to P3 in FIG. 5B so as to operate as an array antenna that performs beamforming. Also, some of the plurality of antenna elements P1 to P3 may be used to perform short-range communication between the electronic devices, thereby selecting an optimum antenna and implementing short-range communication without beamforming.

In this regard, even if a signal is applied simultaneously to the plurality of antenna elements P1 to P3 in the form of an array antenna, it is difficult to obtain array antenna gain because of the configuration structure of the antennas. Since the plurality of antenna elements P1 to P3 are all oriented in different directions, they have different coverage areas even if a signal is simultaneously applied to the plurality of antenna elements P1 to P3. Hence, the present disclosure proposes a method in which only some of the antenna elements in the array antenna, rather than all of them, are operated. In this regard, only some antennas may be operated which are disposed in different positions on the FPCB and cover one of the different coverage areas. Accordingly, the coverage of short-range communication may be expanded by selecting one of the different antenna elements.

The first antenna element P1 may be disposed in an upper area of the FPCB and send and receive a signal in the form of upper radiation. The second antenna element P2 may be disposed in a front area of the FPCB and send and receive a signal in the form of front radiation. In this regard, the second antenna element P2 may be disposed in a lower area of the FPCB and send and receive a signal in the form of lower radiation.

Also, a second-type antenna element, which is different from the first type-antenna element, may be disposed on the FPCB. In this regard, at least one dipole antenna may be disposed on a side of the FPCB. For example, a first dipole antenna element D1 may be disposed on one side of the FPCB, and send and receive a signal in the form of lateral radiation. In this regard, the number of dipole antenna elements may be extended, for example, from 1 to 2, 4, etc. A second dipole antenna element may be disposed at a predetermined distance from the first dipole antenna element D1. Also, a third dipole antenna element and a fourth dipole antenna element may be disposed on the other side of the FPCB, spaced apart from each other by a predetermined distance.

Accordingly, the optimum antenna element may be selected from among the first to third antenna elements P1 to P3 to perform short-range communication between the electronic devices. Consequently, an electronic device comprising the first to third antenna elements P1 to P3 is also able to perform short-range communication with another electronic device in any direction: upper, front, and lower.

Moreover, an electronic device comprising a dipole antenna element may perform short-range communication between electronic devices by selecting the optimum antenna element from a lateral direction, as well as from upper, front, and lower directions. In this regard, short-range communication between the electronic devices may be performed through at least one dipole antenna element. Also, short-range communication between the electronic devices may be performed by selecting one antenna element with optimum performance from among two or more dipole antenna elements.

Figure 6A:
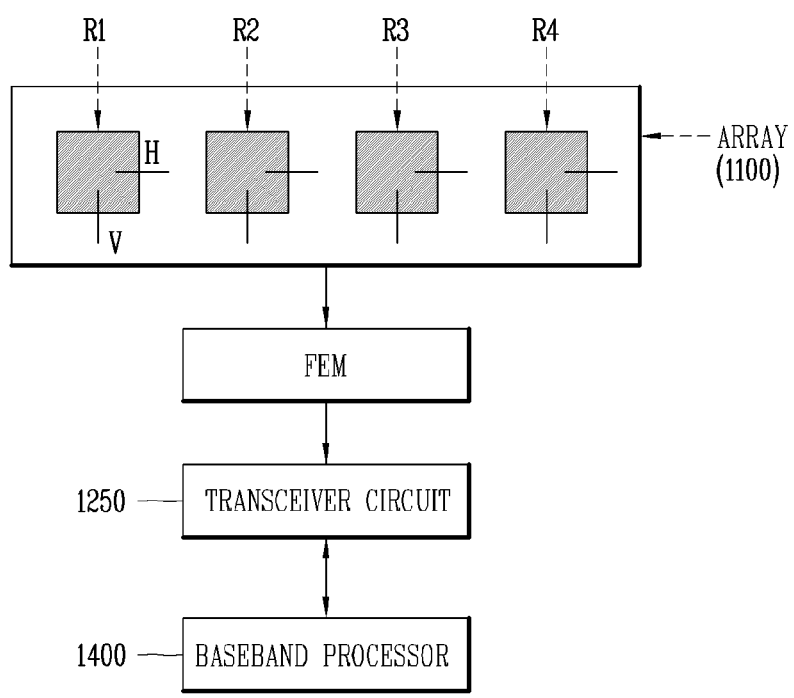
FIG. 6A shows a configuration of an electronic device comprising an array antenna, a transceiver circuit, and a processor. Meanwhile.
Figure 6B:
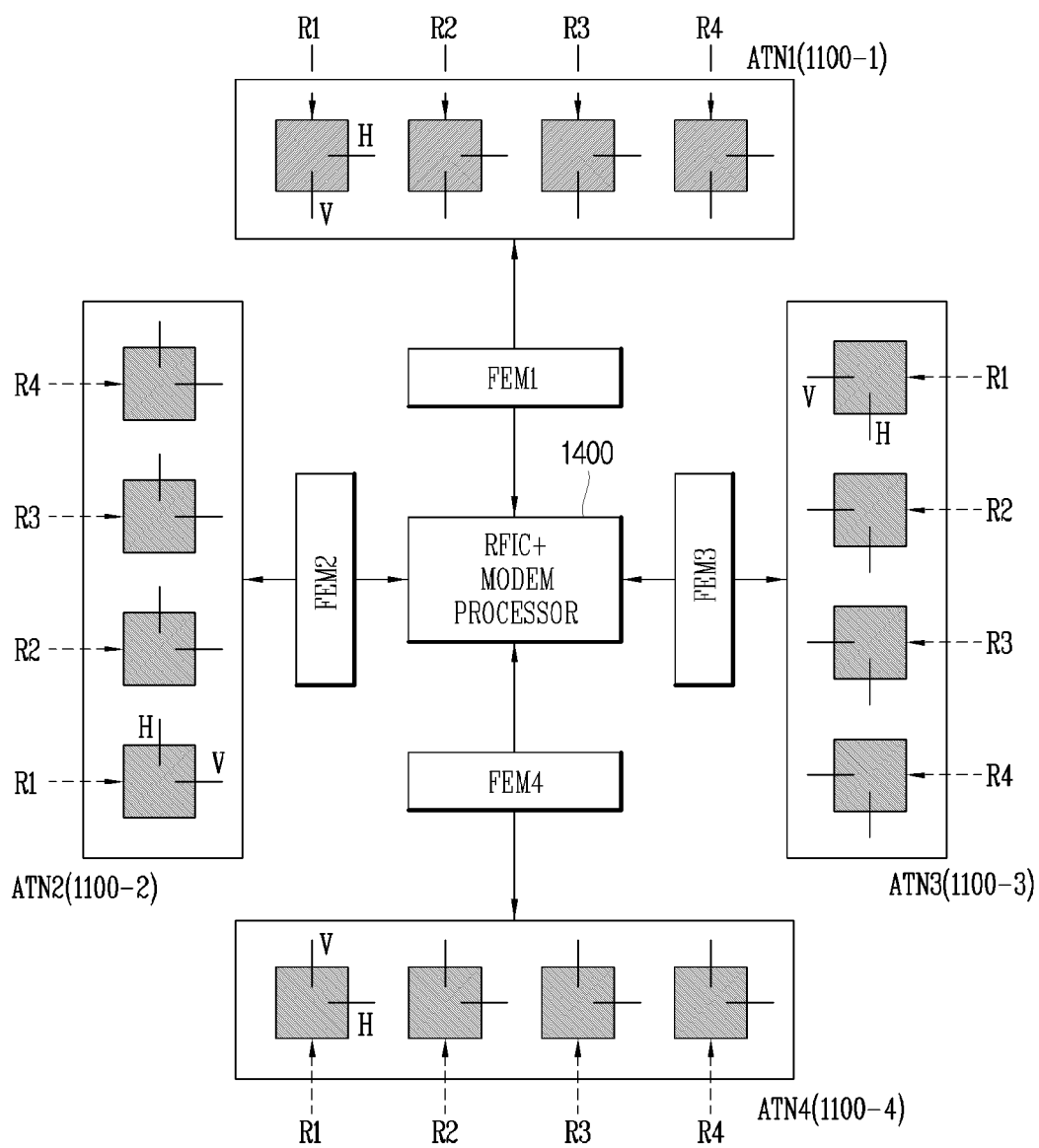
FIG. 6B shows a configuration of an electronic device comprising a plurality of array antennas, a transceiver circuit, and a processor.

Meanwhile, in an electronic device comprising an array antenna that operates in a millimeter-wave (mmWave) band, which is described in this specification, the number of array antennas may be extended, for example, from 1 to 2, 4, etc. In this case, a plurality of array antenna modules may be disposed to perform multiple input multiple output (MIMO). In this regard, FIG. 6A shows a configuration of an electronic device comprising an array antenna, a transceiver circuit, and a processor. Meanwhile, FIG. 6B shows a configuration of an electronic device comprising a plurality of array antennas, a transceiver circuit, and a processor.

Referring to FIGS. 4A to 6B, an electronic device comprising an antenna described in this specification may include an array antenna (ARRAY) 1100, a transceiver circuit 1250, and a processor 1400. The array antenna 1100 may include a plurality of antenna elements R1 to R4. The transceiver circuit 1250 may be operatively coupled to the array antenna 1100, and configured to control a signal in a millimeter-wave band that is applied to the array antenna 1100.

The processor 1400 may be configured to radiate a signal to a second electronic device through one of the plurality of antenna elements and to select an optimum antenna element on the basis of a data rate in the second electronic device which has received the signal. Also, the processor 1400 may be configured to communicate with the second electronic device through the selected antenna element.

The selection of the optimum antenna element and a method of communication through the selected antenna element will be described with reference to FIG. 7. In this regard, FIG. 7 shows a flowchart of a method of performing short-range communication in a mmWave band, which is described in this specification.

Figure 7:
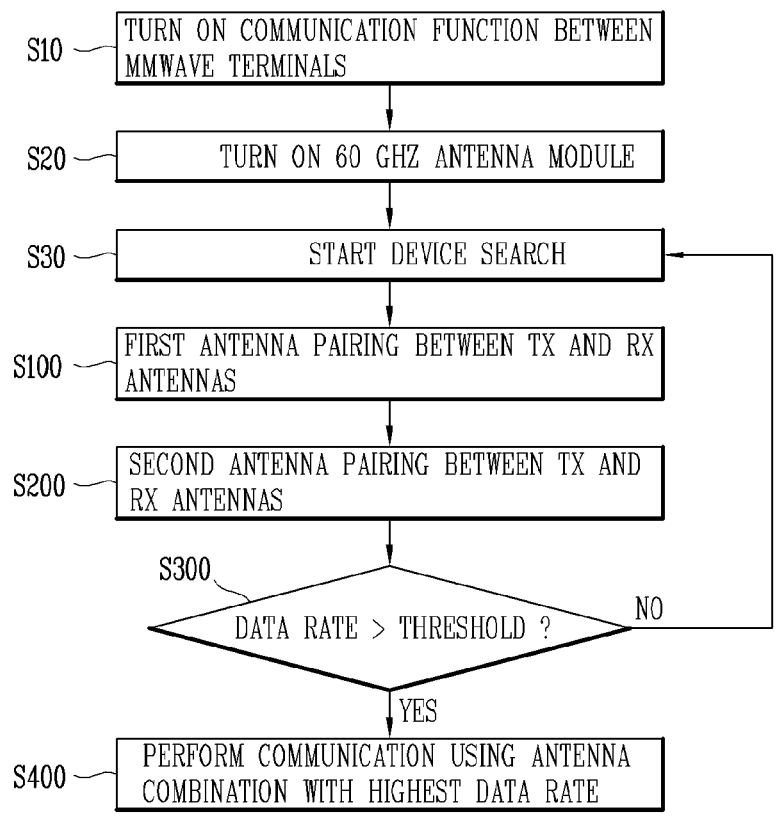
FIG. 7 shows a flowchart of a method of performing short-range communication in a mmWave band, which is described in this specification.

Referring to FIG. 7, in relation to the method of performing mmWave band short-range communication, a terminal-to-terminal communication function may be enabled (S10), and an antenna module operation may be enabled (S20). In this regard, the processor 1400 and components associated with it may be controlled to go into an operable state, in order to enable the terminal-to-terminal communication function (S10).

In an embodiment, a module that perform the terminal-to-terminal communication function in a mmWave band may be run to go into an on state, in order to enable the terminal-to-terminal communication function (S10). In this regard, RF elements within the transceiver circuit 1250 that control the array antenna 1100 may be controlled to be run. In another embodiment, RF elements within a second transceiver circuit 1250b may be controlled to be run, so as to exchange a control message via a different wireless interface that operates in a different band other than the mmWave band.

An antenna module including the array antenna 1100 may be run to go into an on state, so as to enable the antenna module to go into operation (S20). Referring to FIG. 6A, RF elements within the front end module FEM operatively coupled to the array antenna 1100 may be controlled to be run. Referring to FIG. 3B and FIG. 6A, the front end module FEM may include a phase controller 1230 configured to control a signal applied to the antenna elements R1 to R4. Meanwhile, the front end module FEM may further include a power amplifier operatively coupled to the phase controller 1230 and configured to amplify a transmit signal. Also, the front end module FEM may further include a low noise amplifier operatively coupled to the phase controller 1230 and configure to amplify a receive signal.

Referring to FIG. 6B, RF elements within the front end modules FEM1 to FEM4 operatively coupled to a plurality of array antennas 1100-1 to 1100-4 may be controlled to be run. Referring to FIG. 3B and FIG. 6A, the front end modules FEM1 to FEM4 may include a phase controller 1230 configured to control a signal applied to the antenna elements R1 to R4. Meanwhile, the front end module FEM may further include a power amplifier 1210 and 1220 operatively coupled to the phase controller 1230 and configured to amplify a transmit signal. Also, the front end module FEM may further include a low noise amplifier 1310 to 1340 operatively coupled to the phase controller 1230 and configure to amplify a receive signal.

In this regard, although the number of transmit chains is expressed to be two and the number of receive chains is expressed to be four, the number of transmit chains and the number of receive chains are not limited thereto but may vary depending on applications. For example, both the number of transmit chains and the number of receive chains may be configured to be four to perform 4Tx UL-MIMO and 4Rx DL-MIMO.

Referring to FIG. 3B, FIG. 4A, and FIG. 6B, the plurality of array antennas 1100 may be configured to include first to fourth antennas ANT1 to ANT4. In this regard, the first to fourth antennas ANT1 to ANT4 may be disposed on the left side, right side, upper portion, and lower portion of the electronic device. However, the positions of the first to fourth antennas ANT1 to ANT4 are not limited thereto, but may vary depending on applications. Here, each of the first to fourth antennas ANT1 to ANT4 is an array antenna that is configured to perform communication in a mmWave band, for example, a 28, 38.5, or 60 GHz band. In what follows, the array antennas each will be referred to as first to fourth antennas ANT1 to ANT4.

The first to fourth antennas ANT1 to ANT4 may be operatively coupled to the first to fourth front end modules FEM1 to FEM4, respectively. In this regard, the first to fourth front end modules FEM1 to FEM4 each may have a phase controller, a power amplifier, and a receiving amplifier. The first to fourth antennas ANT1 to ANT4 each may include some components of the transceiver circuit 1250 corresponding to RFIC.

The processor 1400 may operatively coupled to the first to fourth front end modules FEM1 to FEM4. The processor 1400 may include some components of the transceiver circuit 1250 corresponding to RFIC. The processor 1400 may include a baseband processor 1400 corresponding to a modem. The processor 1400 may be provided in the form of a system on chip (SoC) so as to include some components of the transceiver circuit 1250 corresponding to RFIC and a baseband processor 1400 corresponding to a modem. However, the processor 1400 is not limited to the configuration of FIG. 6B, but may vary depending on applications.

The processor 1400 may control the first to fourth front end modules FEM1 to FEM4 so as to radiate a signal through at least one of the first to fourth antennas ANT1 to ANT4. In this regard, the optimum antenna may be selected based on the quality of signals received through the first to fourth antennas ANT1 to ANT4.

The processor 1400 may control the first to fourth front end modules FEM1 to FEM4 so as to perform multiple input multiple output (MIMO) through two or more of the first to fourth antennas ANT1 to ANT4. In this regard, it is possible to select an optimum array antenna combination based on the quality and interference level of signals received through the first to fourth antennas ANT1 to ANT4.

The processor 1400 may control the first to fourth front end modules FEM1 to FEM4 so as to perform at least one of the first to fourth antennas ANT1 to ANT4. In this regard, each of the first to fourth antennas ANT1 to ANT4 resonate dually in a first band and a second band, and therefore may perform carrier aggregation (CA) through one array antenna.

The processor 1400 may determine the quality of signal for each antenna in the first band and the second band. The processor 1400 may perform carrier aggregation (CA) through one antenna in the first band and another antenna in the second antenna, based on the signal quality in the first and second bands.

It will be understood by those skilled in the art that various changes and modifications to the above-described embodiments related to an array antenna operating in a millimeter-wave band and an electronic device for controlling the same may be made without departing from the spirt and scope of the present disclosure. Therefore, it should be understood that various changes and modifications to the embodiments fall within the scope of the appended claims.

An electronic device described in this specification may send or receive information simultaneously from various entities such as peripheral electronic devices, external devices, or base stations. Referring to FIGS. 1A to 15, the electronic device may perform multiple input multiple output (MIMO) through the antenna module 1100, the transceiver circuit 1250 for controlling the same, and the baseband processor 1400. By performing multiple input multiple output (MIMO), communications capacity and/or the reliability of information transmission and reception may be enhanced. Accordingly, the electronic device is able to enhance communications capacity by sending or receiving different information simultaneously from a variety of different entities. Consequently, it is possible to enhance communications capacity through MIMO operation without expanding the bandwidth of the electronic device.

Alternatively, the electronic device may enhance the reliability of information from surroundings and reduce latency by sending or receiving the same information simultaneously from a variety of different entities. Accordingly, the electronic device is capable of ultra reliable low latency communication (URLLC), and the electronic device is able to operate as URLLC UE. To this end, a base station performing scheduling may allocate time slots first and foremost for the electronic device operating as URLLC UE. To this end, some of specific time-frequency resources allocated to other UEs may be punctured.

As described above, the plurality of array antennas ANT1 to ANT4 may operate over a wide bandwidth in a first frequency band which is a 28 GHz band and in a second frequency band which is a 38.5 GHz band. Alternatively, the plurality of array antennas ANT1 to ANT4 may operate to resonate dually in a first frequency band which is a 28 GHz band and/or a 38.5 GHz band and in a second frequency band which is a 60 GHz band.

The baseband processor 1400 may perform multiple input multiple output (MIMO) through some of the plurality of antenna elements ANT1 to ANT4 in the first frequency band. Also, the baseband processor 1400 may perform multiple input multiple output (MIMO) through some of the plurality of antenna elements ANT1 to ANT4 in the second frequency band. In this regard, multiple input multiple output (MIMO) may be performed by using array antennas that are configured in such a way that they are spaced far enough apart from each other and rotated at a predetermined angle. Consequently, isolation between a first signal and a second signal in the same band may be improved.

One or more array antennas, among the first to fourth antennas ANT1 to ANT4 in the electronic device, may operate as a radiator in the first frequency band. Meanwhile, one or more array antennas, among the first to fourth antennas ANT1 to ANT4, may operate as a radiator in the second frequency band.

According to an embodiment, the baseband processor 1400 may perform multiple input multiple output (MIMO) through two or more array antennas, among the first to fourth antennas ANT1 to ANT4, in the first frequency band. Meanwhile, the baseband processor 1400 may perform multiple input multiple output (MIMO) through two or more array antennas, among the first to fourth antennas ANT1 to ANT4, in the second frequency band.

In this regard, if the signal quality of two or more array antennas in the first frequency band is lower than or equal to a threshold, the baseband processor 1400 may send the base station a time/frequency resource request for the second frequency band. Accordingly, once a time/frequency resource for the second frequency band is allocated, the baseband processor 1400 may perform multiple input multiple output (MIMO) through two or more array antennas, among the first to fourth antennas ANT1 to ANT4, through the corresponding resource.

Multiple input multiple output (MIMO) using two or more array antennas may be performed in the case of allocation of a resource for the second frequency band as well. Accordingly, it is possible to prevent power consumption which is caused by turning on/off the corresponding front end module FEM over again when the array antennas are changed. Moreover, it is possible to prevent performance degradation with the settling time of an electric part, for example, an amplifier, which is caused by turning on/off the corresponding front end module FEM over again when the array antennas are changed.

Meanwhile, in the case of allocation of a resource for the second frequency band, at least one of the two or more array antennas may be changed, and multiple input multiple output (MIMO) may be performed through the corresponding array antennas. Accordingly, if it is determined that communication using the corresponding array antennas is hardly possible because of different propagation environments of the first and second frequency bands, other array antennas may be used.

According to another embodiment, the baseband processor 1400 may control the transceiver circuit 1250 in such a way as to receive a second signal in the second signal, simultaneously with a first signal in the first band, through one of the first to fourth antennas ANT1 to ANT4. This provides an advantage of performing carrier aggregation (CA) through one antenna.

Accordingly, the baseband processor 1400 may perform carrier aggregation (CA) through a combination of a first frequency band and a second frequency band. Accordingly, the present disclosure has an advantage of receiving wideband reception through carrier aggregation when there is a need to send or receive a large volume of data.

Therefore, an electronic device is capable of enhanced mobile broadband (eMBB) communication, and the electronic device may operate as eMBB UE. To this end, a base station performing scheduling may allocate wideband frequency resources for the electronic device operating as eMBB UE. To this end, carrier aggregation (CA) for available frequency bands may be performed, except for frequency resources that have already been allocated to other UEs.

It will be understood by those skilled in the art that various changes and modifications to the above-described embodiments related to an array antenna operating in a millimeter-wave band and an electronic device for controlling the same may be made without departing from the spirt and scope of the present disclosure. Therefore, it should be understood that various changes and modifications to the embodiments fall within the scope of the appended claims.

Referring to FIG. 7, when an antenna module is enabled for operation (S20), a device search process may be started (S30). In this regard, a sensor module configured to detect the movement, position, and orientation state of the electronic device, in order to search other electronic devices in proximity to the electronic device. Alternatively, out-of-band (00B) communication, for example, WiFi or Bluetooth, may be performed in order to search other electronic devices in proximity to the electronic device.

Meanwhile, in the device search process S30, capability information may be obtained to allow an Rx electronic device to perform mWave communication. In this regard, Tx/Rx electronic devices may exchange information via other wireless interfaces (e.g., WiFi and Bluetooth). Accordingly, a Tx electronic device may perform 5G communication setup only for Rx electronic devices in close proximity that are capable of mmWave communication.

Figure 8:
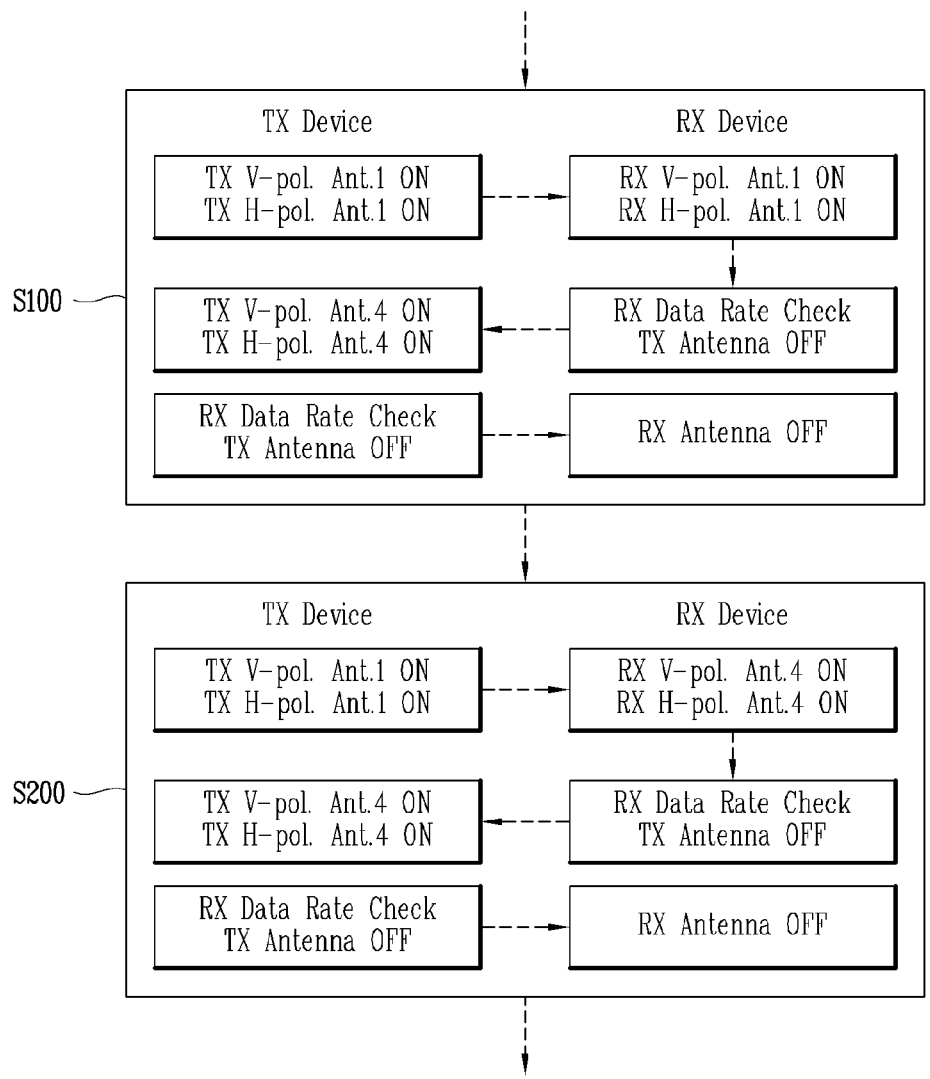
FIG. 8 shows in detail how a data rate is determined based on the antenna pairing of FIG. 7 and a corresponding antenna selection process.

In this regard, an optimum antenna may be selected through a signal in the mmWave band between the electronic device and another electronic device, which is the second electronic device. In this regard, a first antenna pairing process S100 and a second antenna pairing process S200 may be performed. In this case, the first antenna pairing process S100 and the second antenna pairing process S200 are an example of classification given for convenience. In this regard, FIG. 8 shows in detail how a data rate is determined based on the antenna pairing of FIG. 7 and a corresponding antenna selection process.

Referring to FIGS. 4A to 8, the Tx electronic device sends a signal through a first antenna element disposed on the far left in an array antenna in the first antenna pairing process S100. In response to this, the Rx electronic device receives the signal through a first antenna element disposed on the far left in an array antenna. In this regard, the Tx electronic device and the Rx electronic device may send and receive a signal by using vertical polarization V-pol and horizontal polarization H-pol, respectively.

Meanwhile, the Rx electronic device may check Rx data rates in the process based on a signal received through the first antenna element. The performance of communication through this antenna element may be checked by checking the Rx data rates. Such a criterion for determining communication performance is not limited to data rate, but may include RSSI, RSRP, RSRQ, SNR, SINR, BER, etc. The Rx electronic device may have a Tx antenna module turned off in the process of checking data rates.

The Tx electronic device sends a signal through a fourth antenna element disposed on the far right in the array antenna. In response to this, the Rx electronic device receives the signal through the first antenna element disposed on the far left in the array antenna. In this regard, the Tx electronic device and the Rx electronic device may send and receive a signal by using vertical polarization V-pol and horizontal polarization H-pol, respectively.

Meanwhile, the Rx electronic device may check Rx data rates in the process based on a signal received through the first antenna element. The performance of communication through this antenna element may be checked by checking the Rx data rates. Such a criterion for determining communication performance is not limited to data rate, but may include RSSI, RSRP, RSRQ, SNR, SINR, BER, etc. The Rx electronic device may have a Tx antenna module turned off in the process of checking data rates.

According to implementations, the Rx data rates may be checked by the Rx electronic device or the Tx electronic device. The Tx electronic device may check the Rx data rates by receiving information such as the Rx data rates via other wireless interfaces. Meanwhile, once the Rx data rates for signal transmission and reception through a corresponding antenna are checked, the Tx electronic device and the Rx electronic device may control the corresponding Tx antenna module and the corresponding Rx antenna module, respectively, so that they are turned off and disabled.

In this regard, the disabling of the Rx antenna module may mean the disabling of the corresponding Rx antenna element and the RF elements in the FEM coupled thereto. Also, the disabling of the Rx antenna module may mean the disabling of the corresponding Rx antenna element and the RF elements in the FEM coupled thereto.

Referring to FIGS. 4A to 8, the Tx electronic device sends a signal through the first antenna element disposed on the far left in the array antenna in the second antenna pairing process S200. In response to this, the Tx electronic device receives the signal through the fourth antenna element disposed on the far right in the array antenna. In this regard, the Tx electronic device and the Rx electronic device may send and receive a signal by using vertical polarization V-pol and horizontal polarization H-pol, respectively.

Meanwhile, the Rx electronic device may check Rx data rates in the process based on a signal received through the fourth antenna element. The performance of communication through this antenna element may be checked by checking the Rx data rates. Such a criterion for determining communication performance is not limited to data rate, but may include RSSI, RSRP, RSRQ, SNR, SINR, BER, etc. The Rx electronic device may have a Tx antenna module turned off in the process of checking data rates.

The Tx electronic device sends a signal through the fourth antenna element disposed on the far right in the array antenna. In response to this, the Rx electronic device receives the signal through a fourth antenna element disposed on the far right in the array antenna. In this regard, the Tx electronic device and the Rx electronic device may send and receive a signal by using vertical polarization V-pol and horizontal polarization H-pol, respectively.

Meanwhile, the Rx electronic device may check Rx data rates in the process based on a signal received through the fourth antenna element. The performance of communication through this antenna element may be checked by checking the Rx data rates. Such a criterion for determining communication performance is not limited to data rate, but may include RSSI, RSRP, RSRQ, SNR, SINR, BER, etc. The Rx electronic device may have a Tx antenna module turned off in the process of checking data rates.

According to implementations, the Rx data rates may be checked by the Rx electronic device or the Tx electronic device. The Tx electronic device may check the Rx data rates by receiving information such as the Rx data rates via other wireless interfaces. Meanwhile, once the Rx data rates for signal transmission and reception through a corresponding antenna are checked, the Tx electronic device and the Rx electronic device may control the corresponding Tx antenna module and the corresponding Rx antenna module, respectively, so that they are disabled.

In this regard, the disabling of the Rx antenna module may mean the disabling of the corresponding Rx antenna element and the RF elements in the FEM coupled thereto. Also, the disabling of the Rx antenna module may mean the disabling of the corresponding Rx antenna element and the RF elements in the FEM coupled thereto.

Meanwhile, it is possible to determine S300 whether a checked data rate is higher than a threshold through the first antenna pairing process S100 and the second antenna pairing process S200. If the data rate is higher than the threshold, communication may be performed using an antenna combination with a highest data rate (S400). On the other hand, if the data rate is equal to or lower than the threshold, a device search process may be started (S30). In this regard, a frequency band in the repeated first antenna pairing process S100 and second antenna pairing process S200 may be different from a frequency band in the previous first antenna pairing process S100 and second antenna pairing process S200. For example, the frequency band in the previous first antenna pairing process S100 and second antenna pairing process S200 may be a first frequency band in a mmWave band. Meanwhile, the frequency band in the repeated first antenna pairing process S100 and second antenna pairing process S200 may be a second frequency band in the mmWave band.

For another example, referring to FIG. 6B, an array antenna module used in the repeated first antenna pairing process S100 and second antenna pairing process S200 may be different from an array antenna module used in the previous first antenna pairing process S100 and second antenna pairing process S200. For example, the array antenna module in the previous first antenna pairing process S100 and second antenna pairing process S200 may be a first array antenna module 1100-1. Meanwhile, the array antenna module in the repeated first antenna pairing process S100 and second antenna pairing process S200 may be a second array antenna module 1100-2.

As described above, a concrete process of a method of performing mmWave band short-range communication will be described below.

1) If the user turns on the terminal-to-terminal mmWave communication function to use mmWave terminal-to-terminal communication, an antenna module operating in a 60 GHz band may be operated in this embodiment.
2) A terminal sending data for device search is defined as TX, and a terminal receiving the data is defined as RX.
3) Data rates may be checked by operating only one antenna element, rather than all array antennas of TX and RX.
4) In this case, a broad antenna radiation pattern is provided, eliminating the need for beamforming. Thus, the device search process is done by turning on/off one antenna element, i.e., the first antenna element R1, and the beam tracking process may be omitted.
5) Next, a similar process may be repeated through the fourth antenna element R4. In this regard, the first antenna element R1 and fourth antenna element R4 disposed on the far left and right in the array antenna are used because a ground of the antenna module is intersected symmetrically. Thus, signals radiated through the first antenna element R1 and the fourth antenna element R4 are radiated in different directions in a symmetrical radiation pattern.
6) An antenna with a highest data rate is selected after the device search process to perform terminal-to-terminal mmWave communication.
7) In this case, stable coverage and communication performance may be achieved through a broad radiation pattern, even if the terminal is moved.
8) Signals can be sent and received through only one antenna element because short-range communication is performed through different electronic devices within a distance of several meters.

Referring to FIGS. 4A to 8, a detailed operation of the processor 1400 in an electronic device with an antenna described in this specification will be described below. In this regard, a signal may be sent through the first antenna element R1 disposed on the far left in the array antenna 1100 and the fourth antenna element R4 disposed on the far right. In this regard, the number of antenna elements in the array antenna 1100 is not limited to four, but may vary depending on applications. In this regard, the array antenna 1100 may be a one-dimensional array antenna in which a plurality of antenna elements is disposed along one axis. Alternatively, the array antenna 1100 may be a two-dimensional array antenna in which a plurality of antenna elements is disposed along the one axis and the other axis.

In a case where a signal is sent through the first antenna element R1 disposed on the far left in the array antenna 1100 and the fourth antenna element R4 disposed on the far right, the signal may be received through the first antenna element disposed on the far left in the array antenna of the second electronic device and the fourth antenna element disposed on the far right.

The processor 1400 may determine a first data rate for the second electronic device which has received a first signal radiated through the first antenna element R1 in the array antenna 1100. Also, the processor 1400 may determine a second data rate for the second electronic device which has received a second signal radiated through the fourth antenna element R4 in the array antenna 1100.

The processor 1400 may determine the first data rate upon receiving the first signal, which is radiated through the first antenna element R1 in the array antenna 1100, through the first antenna element in the array antenna of the second electronic device. Also, the processor 1400 may determine the second data rate upon receiving the second signal, which is radiated through the fourth antenna element R4 in the array antenna 1100, through the fourth antenna element in the array antenna of the second electronic device. Accordingly, signals may be sent through the antenna elements in the same positions in the different electronic devices.

In this regard, the processor 1400 may select an optimum antenna element corresponding to the higher of the first and second data rates. Also, the processor 1400 may communicate with the second electronic device through the selected antenna element.

The processor 1400 may determine a third data rate when a third signal radiated through the first antenna element R1 in the array antenna 1100 is received through the fourth antenna element in the array antenna of the second electronic device. Also, the processor 1400 may determine a fourth data rate when a fourth signal radiated through the fourth antenna element R4 in the array antenna 1100 is received through the fourth antenna element in the array antenna of the second electronic device. Accordingly, signals may be sent and received through the antenna elements in opposite positions in the different electronic devices.

Figure 9A:
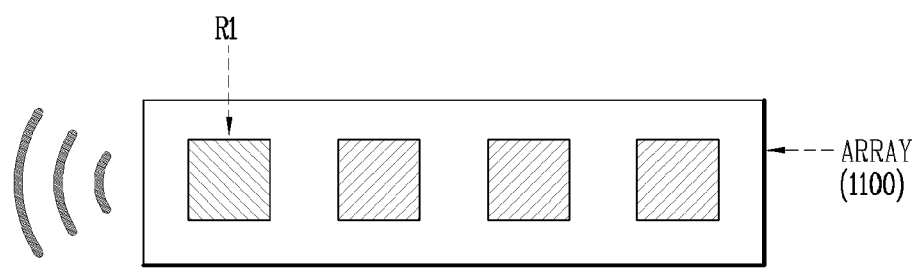
FIG. 9A shows a conceptual diagram of signal radiation through a far-left antenna element in an array antenna. Meanwhile.
Figure 9B:
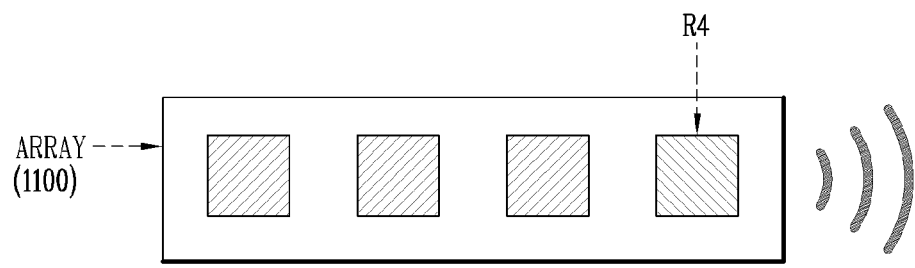
FIG. 9B shows a conceptual diagram of signal radiation through a far-right antenna element in an array antenna.

Meanwhile, an antenna array structure and its related radiation pattern, in relation to a method of sending and receiving signals through antenna elements in opposite positions in different electronic devices described in this specification, will be described below. In this regard, FIG. 9A shows a conceptual diagram of signal radiation through a far-left antenna element in an array antenna. Meanwhile, FIG. 9B shows a conceptual diagram of signal radiation through a far-right antenna element in an array antenna. Referring to FIG. 9A, wireless signals in a mmWave band may be radiated through the far-left antenna element R1 in the array antenna. Referring to FIG. 9B, wireless signals in a mmWave band may be radiated through the far-right antenna element R4 in the array antenna.

In this regard, a method of performing short-range communication using the far-left and far-right antenna elements described in this specification is not limited to the foregoing method. In this regard, referring to FIG. 6A, FIG. 6B, FIG. 9A, and FIG. 9B, short-range communication between electronic devices may be performed through a combination of two or more antenna elements.

For example, signals may be sent through the first and second antenna elements R1 and R2 of the Tx electronic device, and signals may be received through the first and second antenna elements R1 and R2 of the Rx electronic device. For another example, signals may be sent through the first and second antenna elements R1 and R2 of the Tx electronic device, and signals may be received through the third and fourth antenna elements R3 and R4 of the Rx electronic device. For another example, signals may be sent through the third and fourth antenna elements R3 and R4 of the Tx electronic device, and signals may be received through the first and second antenna elements R1 and R2 of the Rx electronic device. For another example, signals may be sent through the third and fourth antenna elements R3 and R4 of the Tx electronic device, and signals may be received through the third and fourth antenna elements R3 and R4 of the Rx electronic device. Accordingly, the above-described device search process and a series of other processes may be performed by using these combinations of antenna elements.

In this way, in the case of short-range communication using two antenna elements on the far left and far right, if a plurality of adjacent electronic devices is disposed around the Tx electronic device, the level of interference with other electronic devices other than the Rx electronic device may be reduced.

FIG. 10 shows a radiation pattern of a signal radiated through a far-left antenna element in an array antenna and a radiation pattern of a signal radiated through a far-right antenna element. Referring to FIG. 9A, FIG. 9B, and FIG. 10, the radiation pattern of a signal radiated through the far-left antenna element R1 in the array antenna and the radiation pattern of a signal radiated through the far-right antenna element R4 may be symmetrical so as to be oriented in opposite directions.

Referring to FIGS. 4A to 10, the characteristics of a radiation pattern of a single antenna element described in this specification and its related short-range communication characteristics will be described below.

1) When the first antenna element R1 and the fourth antenna element R4 are operated, their radiation patterns are oriented in opposite directions.
2) A device search is completed by turning on/off the first antenna element R1 and the fourth antenna element R4 in turn. Accordingly, searching time and the power consumption of the mmWave module can be reduced by performing the device search process twice, as compared to the existing mmWave array antenna cell search where beam tracking needs to be done eight or more times.
3) A single antenna gain of 0 to 5 dBi between 0 to 70 degrees enables short-range communication.
4) Thus, using this antenna operation scenario in mmWave short-range communication, low power consumption, broad radiation coverage, and reliable communication characteristics can be achieved, compared to the existing ones.

Different electronic devices described in this specification may be disposed in proximity to each other as in FIG. 4A. Referring to FIGS. 4A and 5A, short-range communication may be performed in a mmWave band by using the antenna element disposed on the far right of the electronic device 1000 and the antenna element disposed on the far left of the second electronic device 2000.

In this regard, the processor 1400 may select an optimum antenna element corresponding to the highest of the first to fourth data rates. The processor 1400 may communicate with the second electronic device through the selected antenna element.

In relation to an antenna selection process described in this specification, an optimum antenna may be selected using different polarization signals. According to an embodiment, the processor 1400 may send and receive a signal through a vertical polarization signal and a horizontal polarization signal, for each of the first to fourth antenna elements R1 to R4. Also, the processor 1400 may select an optimum combination of antenna elements based on an average value of different data rates for the received vertical and horizontal polarization signals. In this regard, the orientation state of an electronic device such as a mobile terminal changes frequently depending on how the user is carrying it around. Thus, communication performance may be improved by selecting an optimum combination of antenna elements based on an average value of different data rates for received vertical and horizontal polarization signals.

According to another embodiment, the processor 1400 may send and receive a signal through a vertical polarization signal and a horizontal polarization signal, for each of the first to fourth antenna elements R1 to R4. Also, the processor 1400 may select an optimum antenna element and an optimum polarization combination based on different antenna combinations and different data rates for different combinations of the received vertical and horizontal polarization signals.

In this regard, if the mobility of an electronic device such as a mobile terminal is not high, an optimum antenna combination and an optimum polarization combination may be selected by taking into account both antenna combination and polarization state. Accordingly, the number of available MIMO streams may be increased by taking into both the optimum antenna combination and the optimum polarization combination. Such an increase in the number of available MIMO streams may increase communication capacity.

In relation to a data rate determination process described in this specification, ON/OFF may be performed for each RF element in a FEM or transceiver circuit functionally associated with paired or selected antennas. The processor 1400 may control a first transmitter module corresponding to the first antenna element to go into an on state. The processor 1400 may determine a data rate in the second electronic device. Also, the processor 1400 may send a control message such that a first receiver module corresponding to the first antenna element of the second electronic device goes into an off state.

Meanwhile, the processor 1400 may control a fourth transmitter module corresponding to the fourth antenna element to go into an on state. The processor 1400 may determine a data rate in the second electronic device. Also, the processor 1400 may send a control message such that a fourth receiver module corresponding to the fourth antenna element of the second electronic device goes into an off state.

An electronic device performing mmWave band short-range communication described in this specification may further include a second transceiver circuit 1250*b* which provides another wireless interface. In this regard, the second transceiver circuit 1250*b* may be configured to operate in a different frequency band than the millimeter-wave band. The processor 1400 may control in such a way that a data rate in the second electronic device is received through the second transceiver circuit 1250*b*. Also, the processor 1400 may control in such a way that a control message for controlling a receiver module of the second electronic device is sent through the second transceiver circuit 1250*b*. Accordingly, control messages can be exchanged stably even if communication performance in the mmWave band is degraded.

Meanwhile, the aforementioned control messages are sent and received through two or more wireless interfaces, thereby improving stability. In this regard, the processor 1400 may control in such a way that a data rate in the second electronic device is received through the transceiver circuit 1250 and the second transceiver circuit 1250. Also, the processor 1400 may control in such a way that a control message for controlling the receiver module of the second electronic device is sent through the transceiver circuit 1250 and the second transceiver circuit 1250*b*.

An electronic device performing mmWave band short-range communication described in this specification may include a sensor module 140 for determining the degree of proximity to other electronic devices. The sensor module 140 may be configured to detect the movement, position, and orientation state of the electronic device.

In this regard, the processor 1400 may determine whether the electronic device detected through the sensor module 140 and the second electronic device are in proximity within a predetermined distance. Upon determining that the second electronic device is in proximity, the processor 1400 may radiate a signal to the second electronic device through one of a plurality of antenna elements. Also, the processor 1400 may select an optimum antenna element on the basis of a data rate in the second electronic device which has received the signal.

Meanwhile, the processor 1400 may perform detection through the sensor module 140 and on/off control for each transmitter/receiver module. In this regard, the processor 1400 may determine whether the electronic device detected through the sensor module 140 and the second electronic device are in proximity within a predetermined distance. Upon determining that the second electronic device is in proximity, the processor 1400 may control a first transmitter module corresponding to the first antenna element R1 to go into an on state. In this regard, a switch may be provided to control the on/off state between the first antenna element R1 and the FEM. The processor 1400 may determine a data rate in the second electronic device. Also, the processor 1400 may send a control message such that a first receiver module corresponding to the first antenna element of the second electronic device goes into an off state.

As seen from above, an electronic device comprising an antenna according to an aspect of the present disclosure has been described. Hereinafter, a method of performing mmWave band short-range communication in an electronic device according to another aspect of the present disclosure will be described. In this regard, the above-described technical features of the electronic device also apply to a method of performing short-range communication to be described below.

Figure 11:
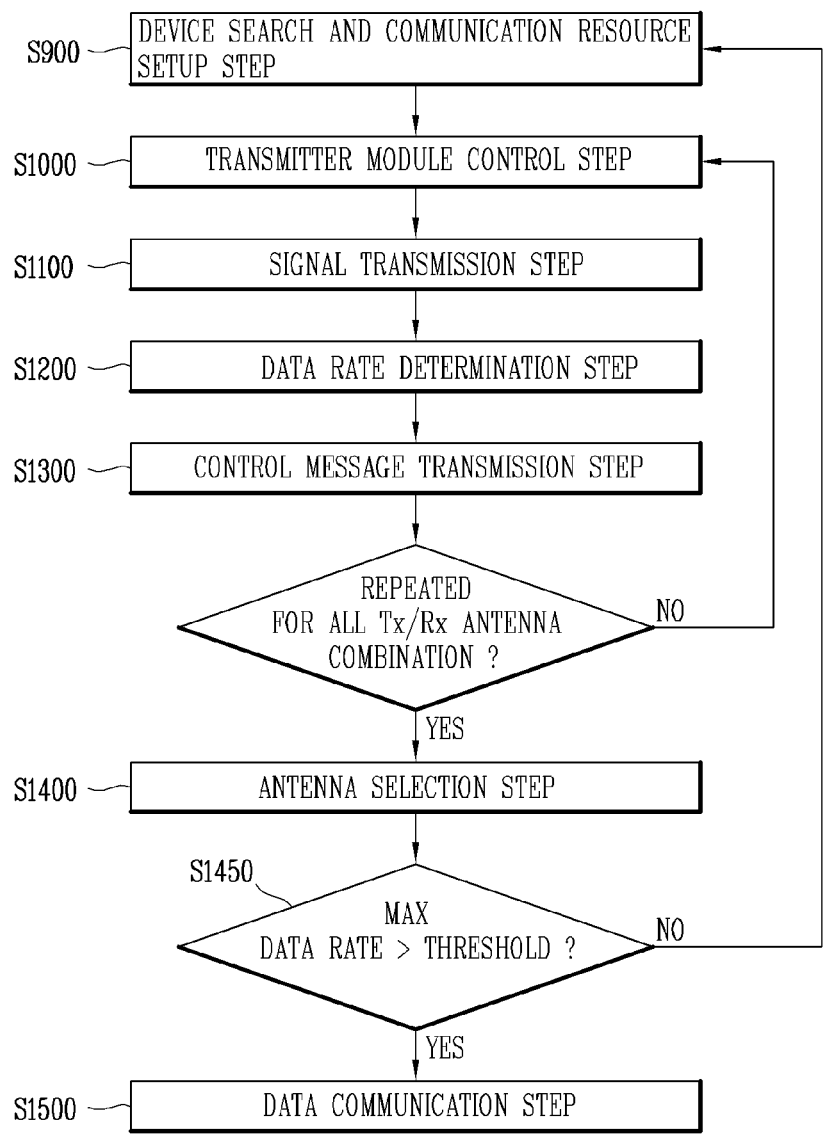
FIG. 11 shows a flowchart of a method of performing mmWave band short-range communication in an electronic device according to an embodiment of the present disclosure.

In this regard, FIG. 11 shows a flowchart of a method of performing mmWave band short-range communication in an electronic device according to an embodiment of the present disclosure. Referring to FIG. 11, the method of performing short-range communication may include a transmitter module control step S1000, a signal transmission step S1100, and a data rate determination step S1200. The method of performing short-range communication may include a control message transmission step S1300, an antenna selection step S1400, and a data communication step S1500.

In the transmitter module control step S1000, a transmitter module corresponding to a corresponding antenna element, for example, a first antenna element or a fourth antenna element, may be controlled to go into an on state. For example, in the transmitter module control step S1000, a first transmitter module corresponding to a first antenna element may be controlled to go into an on state. For another example, in the transmitter module control step S1000, a fourth transmitter module corresponding to a fourth antenna element may be controlled to go into an on state.

In the signal transmission step S1100, the transceiver circuit may be controlled so as to radiate a signal to the second electronic device through one of a plurality of antenna elements constituting an array antenna. In the signal transmission step S1100, a first signal may be sent through the first antenna element disposed on the far left in the array antenna. In the signal transmission step S1100, a second signal may be sent through the fourth antenna element disposed on the far right in the array antenna.

Accordingly, the first signal and the second signal may be respectively received through the first antenna element disposed on the far left and the fourth antenna element disposed on the far right, in the array antenna of the second electronic device, which is an Rx electronic device. In this regard, the process of receiving the first signal and the second signal may be performed through such a procedure as in FIGS. 7 and 8. However, the process of receiving the first signal and the second signal is not limited to the order described with reference to FIGS. 7 and 8, but may vary depending on applications.

After the signal transmission step S1100, the data rate determination step S1200 may be performed to determine a data rate in the second electronic device which has received the signal.

In this regard, in the data rate determination step S1200, it is possible to determine a first data rate in the second electronic device which has received a first signal radiated through the first antenna element in the array antenna. Also, in the data rate determination step S1200, it is possible to determine a second data rate in the second electronic device which has received a second signal radiated through the fourth antenna element in the array antenna.

Specifically, in the data rate determination step S1200, a first data rate may be determined upon receiving a first signal radiated through the first antenna element in the array antenna through the first antenna element in the array antenna of the second electronic device. In the data rate determination step S1200, a second data rate may be determined upon receiving a second signal radiated through the fourth antenna element in the array antenna through the first antenna element in the array antenna of the second electronic device.

Also, in the data rate determination step S1200, a third data rate may be determined when a third signal radiated through the first antenna element in the array antenna is received through the fourth antenna element in the array antenna of the second electronic device. In the data rate determination step S1200, a fourth data rate may be determined when a fourth signal radiated through the fourth antenna element in the array antenna is received through the fourth antenna element in the array antenna of the second electronic device.

After the data rate determination step S1200, the control message transmission step S1300 may be performed to send a control message so that a particular receiver module corresponding to a particular antenna element of the second electronic device goes into an off state. In the control message transmission step S1300, a control message may be sent such that a first receiver module corresponding to the first antenna element of the second electronic device goes into an off state. Also, in the control message transmission step S1300, a control message may be sent such that a fourth receiver module corresponding to the fourth antenna element of the second electronic device goes into an off state.

Meanwhile, after the data rate determination step S1200, the control message transmission step S1300 may be repeated every time a Tx antenna element of a Tx electronic device or an Rx antenna element of an Rx electronic device is changed. Thus, in the transmitter module control step S1000, the fourth transmitter module corresponding to the fourth antenna element may be controlled to go into an on state. Accordingly, in the control message transmission step S1300, a data rate in the second electronic device may be determined, and a control message may be sent such that a fourth receiver module corresponding to the fourth antenna element of the second electronic device goes into an off state.

As the data rate determination step S1200 and the control message transmission step S1300 are repeated, an optimum antenna for a Tx/Rx antenna combination may be selected. In this regard, in the antenna selection step S1400, an optimum antenna element may be selected on the basis of a data rate in the second electronic device which has received the signal. In this regard, an optimum antenna element and an optimum polarization combination may be selected based on a vertical/horizontal polarization combination, apart from a combination of the first and fourth antenna elements of the Tx/Rx electronic device.

Meanwhile, even when the optimum antenna element is selected, a communication performance evaluation step S1450 may be performed to determine whether the corresponding data rate is lower than or equal to a threshold. In the communication performance evaluation step S1450, RSSI, RSRP, RSRQ, SNR, SINR, BER, etc. may be used, as well as data rate.

In the communication performance evaluation step S1450, a determination may be made whether communication performance (e.g., data rate) for an optimum antenna element combination selected on the basis of a data rate in the second electronic device which has received the signal is higher than a threshold. In the communication performance evaluation step S1450, if the communication performance for the optimum antenna element combination is lower than or equal to the threshold, a device search and communication resource setup step S900 may be performed.

In the device search and communication resource setup step S900, a determination may be made whether there is an electronic device in proximity that will perform 5G data communication. Also, in the device search and communication resource setup step S900, if there is such an electronic device in proximity, other communication resources, that is, other frequency bands of the mmWave band, may be selected. Accordingly, the transmitter module control step S1000 through the communication performance evaluation step S1450 may be performed through other frequency bands of the mmWave band.

Moreover, in the device search and communication resource setup step S900, if there is such an electronic device in proximity, the transmitter module control step S1000 through the communication performance evaluation step S1450 may be performed through an antenna element in another array antenna. In this regard, if communication performance through an antenna element in a first array antenna 1100-1 disposed in an upper portion of the electronic device is lower than or equal to a threshold, a communication setup through an antenna element in another array antenna may be performed. For example, the selection of the optimum antenna and the communication performance evaluation step may be performed through an antenna element in a second array antenna 1100-2 disposed on one side of the electronic device.

In the communication performance evaluation step S1450, if communication performance for an optimum antenna element combination is higher than a threshold, the data communication step S1500 may be performed. In the data communication step S1500, communication with the second electronic device may be performed through a selected antenna element. In this regard, a Tx/Rx electronic device may perform data communication through a 5G mmWave band without going through a base station.

As above, an array antenna operating in a millimeter-wave band and an electronic device for controlling the same according to the present disclosure have been described. Now, a wireless communication system including such an array antenna operating in a millimeter-wave band, an electronic device for controlling the same, and a base station will be described. In this regard, FIG. 12 illustrates a block diagram of a wireless communication system to which methods proposed in this specification are applicable.

Figure 12:
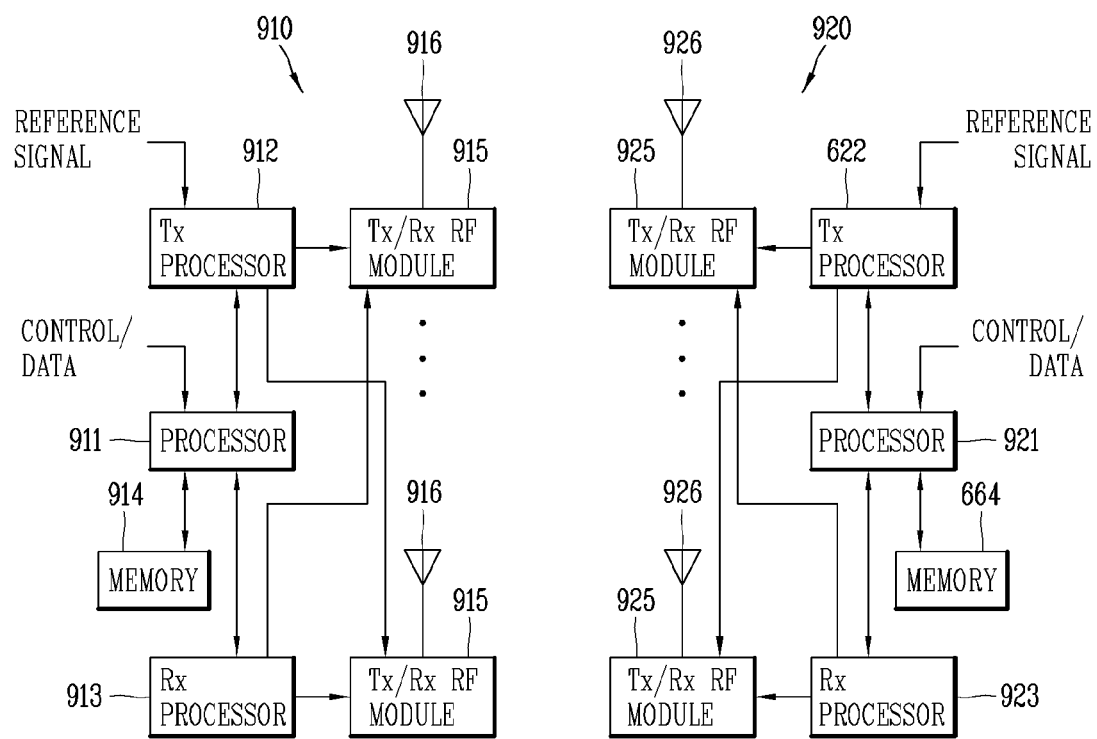
FIG. 12 illustrates a block diagram of a wireless communication system to which methods proposed in this specification are applicable.

Referring to FIG. 12, the wireless communication system may include a first communication device 910 and/or a second communication device 920. The term 'A and/or B' may be interpreted as having the same meaning as 'including at least one of A or B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper layer packet from a core network may be provided to the processor 911. The processor may implement the function of an L2 layer. In DL, the processor may provide multiplexing between a logical channel and a transport channel and radio resource allocation to the second communication device 920, and may be responsible for signaling to the second communication device. The Tx processor 912 may implement various signal processing functions for an L1 layer (i.e., a physical layer). The signal processing function may facilitate forward error correction (FEC) in the second communication device, and include coding and interleaving. Encoded and modulated symbols may be divided into parallel streams. Each stream may be mapped to an OFDM subcarrier, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. Each spatial stream may be provided to the different antenna 916 via the separate Tx/Rx module (or transceiver) 915. Each Tx/Rx module may modulate an RF carrier into a spatial stream for transmission. The second communication device may receive a signal through the antenna 926 of each Tx/Rx module (or transceiver) 925. Each Tx/Rx module may recover information modulated to the RF carrier, and provide it to the RX processor 923. The RX processor may implement various signal processing functions of the layer 1. The RX processor may perform spatial processing with respect to information to recover an arbitrary spatial stream destined for the second communication device. If multiple spatial streams are destined for the second communication device, they may be combined into a single OFDMA symbol stream by plural RX processors. The RX processor may transform the OFDMA symbol stream from a time domain to a frequency domain by using Fast Fourier Transform (FFT). A frequency domain signal may include an individual OFDMA symbol stream for each subcarrier of the OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted by the first communication device on the physical channel. The corresponding data and control signal may then be provided to the processor 921.

UL (communication from the second communication device to the first communication device) may be processed in the first communication device 910 in a manner similar to that described with respect to the receiver function in the second communication device 920. Each Tx/Rx module 925 may receive a signal via the antenna 926. Each Tx/Rx module may provide the RF carrier and information to the RX processor 923. The processor 921 may be associated with the memory 924 that stores program code and data. The memory may be referred to as a computer-readable medium.

In the above, an array antenna operating in a millimeter-wave band and an electronic device for controlling the same have been described. Technical advantages of such an array antenna operating in a millimeter-wave band and an electronic device for controlling the same will be described as follows.

Technical advantages of an array antenna operating in a millimeter-wave band and an electronic device for controlling the same will be described as follows.

According to an embodiment, it is possible to provide a communication service between electronic devices without going through a base station in a millimeter-wave band.

According to an embodiment, it is possible to select an optimum antenna combination in order to provide 5G data communication between electronic devices.

According to an embodiment, it is possible to provide 5G data communication by selecting an optimum antenna combination in order to provide 5G data communication between electronic devices in accordance with communication performance indicators such as data rate.

According to an embodiment, it is possible to provide 5G data communication between electronic devices through one antenna element within an array antenna without a repetitive beamforming process.

According to an embodiment, it is possible to solve the problems of power consumption and heat generation resulting from the repetitive beamforming process.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the aforementioned disclosure, design and operations of an array antenna operating in a mmWave band and an electronic device controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device comprising:
   an array antenna including a plurality of antenna elements;
   a transceiver circuit operatively coupled to the array antenna and configured to control a signal of a millimeter wave band applied to the array antenna; and
   a processor operatively coupled to the transceiver circuit and configured to:

control a first signal to be radiated to a second electronic device by turning on a transmitting first antenna element of the plurality of antenna elements disposed at a far-left side of the array antenna and control a second signal to be radiated to the second electronic device by turning on a transmitting fourth antenna element of the plurality of antenna elements disposed at a far-right side of the array antenna, wherein a radiation pattern of the transmitting first antenna element is in a first direction and a radiation pattern of the transmitting fourth antenna element is in a second direction opposite to the first direction;

determine a first data rate of the second electronic device based on the first signal radiated through the transmitting first antenna element and a second data rate of the second electronic device based on the second signal radiated through the transmitting fourth antenna element;

select an optimum antenna element based on the first data rate and the second data rate of the second electronic device receiving the signal; and perform communication with the second electronic device through the selected optimum antenna element, wherein the first signal is received through a receiving first antenna element disposed at a far-left side of an array antenna of the second electronic device and the second signal is received through a receiving fourth antenna element disposed at a far-right side of the array antenna of the second electronic device.

2. The electronic device of claim 1, wherein the array antenna includes first to third antenna elements disposed at different positions on a flexible printed circuit board (FPCB), and wherein one of the first to third antenna elements which is disposed in different positions on the FPCB is partially operated to cover one of different coverage areas.

3. The electronic device of claim 1, wherein the processor is further configured to:

determine a third data rate based on a third signal radiated through the transmitting first antenna element being received through the receiving fourth antenna element of the array antenna of the second electronic device, and determine a fourth data rate based on a fourth signal radiated through the transmitting fourth antenna element being received through the receiving fourth antenna element of the array antenna of the second electronic device.

4. The electronic device of claim 3, wherein the processor is further configured to select the optimum antenna element corresponding to the highest of the first to fourth data rates.

5. The electronic device of claim 1, wherein the processor is further configured to select the optimum antenna element corresponding to the higher of the first and second data rates.

6. The electronic device of claim 1, wherein the processor is further configured to:

send and receive vertical polarization signals and horizontal polarization signals for each of the first to fourth antenna elements; and select an optimum combination of antenna elements based on an average value of different data rates for the received vertical and horizontal polarization signals.

7. The electronic device of claim 1, wherein the processor is further configured to:

send and receive vertical polarization signals and horizontal polarization signals for each of the first to fourth antenna elements; and select the optimum antenna element and an optimum polarization combination based on different antenna combinations and different data rates for different combinations of the received vertical and horizontal polarization signals.

8. The electronic device of claim 1, wherein the processor is further configured to:

control a first transmitter module corresponding to the transmitting first antenna element to enter an on state;

determine the data rate of the second electronic device; and send a control message such that a first receiver module corresponding to the receiving first antenna element of the second electronic device enters an off state.

9. The electronic device of claim 8, wherein the processor is further configured to:

control a fourth transmitter module corresponding to the transmitting fourth antenna element to enter an on state;

determine the data rate of the second electronic device; and sends a control message such that a fourth receiver module corresponding to the receiving fourth antenna element of the second electronic device enters an off state.

10. The electronic device of claim 1, further comprising a second transceiver circuit that operates in a different frequency band than the millimeter wave band, wherein the processor is further configured to receive the data rate of the second electronic device through the second transceiver circuit, and control the second transceiver circuit such that a control message for controlling a receiver module of the second electronic device is sent through the second transceiver circuit.

11. The electronic device of claim 1, further comprising a second transceiver circuit that operates in a different frequency band than the millimeter wave band, wherein the processor is further configured to receive the first and second data rate-rates of the second electronic device through the second transceiver circuit, and control the transceiver circuit and the second transceiver circuit such that a control message for controlling a receiver module of the second electronic device is sent through the transceiver circuit and the second transceiver circuit.

12. The electronic device of claim 1, further comprising a sensor module configured to detect a movement, position, and orientation state of the electronic device, wherein the signal is radiated to the second electronic device in response to a determination, via information from the sensor module, that the electronic device and the second electronic device are within a predetermined distance from each other.

13. The electronic device of claim 1, further comprising a sensor module configured to detect a movement, position, and orientation state of the electronic device, wherein the processor is further configured to, based on a determination via information from the sensor module that the electronic device and the second electronic device are within a predetermined distance from each other, control a first transmitter module corresponding to the first antenna element to enter an on state, determine the first and second data rates of the second electronic device, and send a control message such that a first receiver module corresponding to the first antenna element of the second electronic device enters an off state.

14. A method of performing mmWave band short-range communication in an electronic device, the method comprising:

a signal transmission step in which a transceiver circuit is controlled such that a first signal is radiated to a second electronic device by turning on a transmitting first antenna element of a plurality of antenna elements of an array antenna disposed at a far-left side of the array antenna and such that a second signal is radiated to the second electronic device by turning on a transmitting fourth antenna element of the plurality of antenna elements disposed at a far-right side of the array antenna, wherein a radiation pattern of the transmitting first antenna element is in a first direction and a radiation pattern of the transmitting fourth antenna element is in a second direction opposite to the first direction;

a data rate determining step in which a first data rate of the second electronic device is determined based on the first signal radiated through the transmitting first antenna element and a second data rate of the second electronic device is determined based on the second signal radiated through the transmitting fourth antenna element;

an antenna selection step in which an optimum antenna element is selected based on the first data rate and the second data rate of the second electronic device; and performing communication with the second electronic device through the selected optimum antenna element, wherein the first signal is received through a receiving first antenna element disposed at a far-left side of an array antenna of the second electronic device and the second signal is received through a receiving fourth antenna element disposed at a far-right side of the array antenna of the second electronic device to a second direction opposite to the first direction.

15. The method of claim 14, wherein in the data rate determination step:

a third data rate is determined based on a third signal radiated through the transmitting first antenna element in the array antenna being received through the receiving fourth antenna element in the array antenna of the second electronic device, and a fourth data rate is determined based on a fourth signal radiated through the transmitting fourth antenna element in the array antenna being received through the receiving fourth antenna element in the array antenna of the second electronic device.

16. The method of claim 14, further comprising:

a transmitter module control step, before the signal transmission step, in which a first transmitter module corresponding to the first antenna element is controlled to enter an on state; and a control message transmission step, after the data rate determination step, in which a control message is sent such that a first receiver module corresponding to the receiving first antenna element of the second electronic device enters an off state, wherein in the transmitter module control step, a fourth transmitter module corresponding to the receiving fourth antenna element enters an on state, and wherein in the control message transmission step, the data rate of the second electronic device is determined and a control message is sent such that a fourth receiver module corresponding to the receiving fourth antenna element of the second electronic device enters an off state.

* * * * *